(12) United States Patent
Baldi

(10) Patent No.: US 12,177,128 B2
(45) Date of Patent: Dec. 24, 2024

(54) METHODS AND SYSTEMS FOR AUTONOMOUS RULE-BASED TASK COORDINATION AMONGST EDGE DEVICES

(71) Applicant: Pensando Systems Inc., Milpitas, CA (US)

(72) Inventor: Mario Baldi, Harpswell, ME (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 136 days.

(21) Appl. No.: 17/131,599

(22) Filed: Dec. 22, 2020

(65) Prior Publication Data

US 2022/0200910 A1    Jun. 23, 2022

(51) Int. Cl.
*H04L 47/20*  (2022.01)
*H04L 45/74*  (2022.01)
*H04L 61/5007*  (2022.01)

(52) U.S. Cl.
CPC .............. *H04L 47/20* (2013.01); *H04L 45/74* (2013.01); *H04L 61/5007* (2022.05)

(58) Field of Classification Search
CPC ..... H04L 45/74; H04L 61/5007; H04L 47/20; H04L 67/1095; H04L 65/403; H04L 63/0236; H04L 45/586; H04L 12/4641; H04L 47/125; H04L 49/70; H04L 63/1425; H04L 12/4633; H04L 63/0227; H04L 67/568; H04L 43/50; H04L 61/2514; G06F 11/2074; G06F 11/2076
USPC ......................................................... 370/392
See application file for complete search history.

(56) References Cited

U.S. PATENT DOCUMENTS

| 10,951,537 B1* | 3/2021 | Bshara ................ H04L 49/9068 |
| 2004/0062399 A1* | 4/2004 | Takase ................ H04L 63/0428 380/277 |
| 2004/0228304 A1* | 11/2004 | Riedel ................... H04W 36/26 370/332 |

(Continued)

FOREIGN PATENT DOCUMENTS

WO    WO-2016050315 A1 *   4/2016   ......... G06F 12/1458

OTHER PUBLICATIONS

Traffic characterization study on EPON upstream channel Özgür Can Turna;M. Ali Aydin;Tülin Atmaca;A. Halim Zaim;Tuan-Dung Nguyen 2011 7th International Wireless Communications and Mobile Computing Conference Year: 2011 | Conference Paper | Publisher: IEEE (Year: 2011).*

(Continued)

*Primary Examiner* — Djenane M Bayard
(74) *Attorney, Agent, or Firm* — LOZA LOZA LLP

(57) ABSTRACT

Methods and systems for autonomous rule-based task coordination amongst edge devices are disclosed. Embodiments of the present technology may include a method for processing packet traffic at an edge device, the method including determining a side of a communication that corresponds to an edge device with regard to packet traffic. Embodiments may also include applying a task distribution rule to the packet traffic using the determined side of the communication that corresponds to the edge device to determine if a particular task related to the packet traffic should be executed at the edge device. In some embodiments, the task distribution rule is configured to ensure that the particular task is executed at only one side of the communication.

38 Claims, 24 Drawing Sheets

(56) References Cited

U.S. PATENT DOCUMENTS

| | | | | |
|---|---|---|---|---|
| 2009/0067440 A1* | 3/2009 | Chadda | .................. | H04L 45/74 |
| | | | | 370/401 |
| 2010/0202344 A1* | 8/2010 | Kawakami | ............ | H04W 36/02 |
| | | | | 370/328 |
| 2013/0223438 A1* | 8/2013 | Tripathi | .................. | H04L 49/25 |
| | | | | 370/392 |
| 2018/0146073 A1* | 5/2018 | Kameyama | ............. | H04L 45/74 |
| 2019/0079869 A1 | 3/2019 | Baldi et al. | | |
| 2019/0199544 A1* | 6/2019 | Wang | ....................... | H04L 47/32 |
| 2019/0372906 A1 | 12/2019 | Baldi et al. | | |
| 2020/0304413 A1* | 9/2020 | MacCarthaigh | ........ | H04L 47/19 |
| 2020/0336436 A1 | 10/2020 | Baldi et al. | | |

OTHER PUBLICATIONS

Survey of Public Safety Communications: User-Side and Network-Side Solutions and Future Directions Wei Yu; Hansong Xu; James Nguyen; Erik Blasch; Amirshahram Hematian; Weichao Gao IEEE Access Year: 2018 | vol. 6 | Journal Article | Publisher: IEEE (Year: 2018).*

Traffic characterization study on EPON upstream channel Özgür Can Turna;M. Ali Aydin;Tülin Atmaca;A. Halim Zaim;Tuan-Dung Nguyen 2011 7th International Wireless Communications and Mobile Computing Conference Year: 2011 | Conference Paper | Publisher: IEEE (Year: 2011) (Year: 2018).*

* cited by examiner

| IP ADDRESSES BEHIND LOCAL EDGE DEVICE | IP ADDRESSES BEHIND REMOTE EDGE DEVICE(S) |
|---|---|
| XXXX.XXXX.XXXX.XXXX | XXXX.XXXX.XXXX.XXXX |
| | XXXX.XXXX.XXXX.XXXX |
| | XXXX.XXXX.XXXX.XXXX |
| | ... |
| | ... |
| | ... |
| | XXXX.XXXX.XXXX.XXXX |

METHODS AND SYSTEMS FOR AUTONOMOUS RULE-BASED TASK COORDINATION AMONGST EDGE DEVICES

BACKGROUND

In a network, such as a cloud or data center network, some packet traffic may move east-west between hosts in the network. East-west movement of packet traffic may involve traversing multiple edge devices in the form of Network Interface Cards (NICs). NICs with enhanced capabilities, sometimes, referred to as "SmartNICs," are being deployed in networks. In some networks, the NICs perform additional tasks on the east-west packet traffic beyond traditional traffic forwarding functionality. For example, NICs may identify and mirror certain packet traffic for network monitoring (e.g., Switch Port Analyzer (SPAN), Remote SPAN (RSPAN), Encapsulated RSPAN (ERSPAN)), may implement access control policies by selectively filtering packets, may collect flow based and packet based telemetry data, and may perform other actions on packets individually or on a per-flow basis. However, if two NICs on opposite sides of an east-west connection in a cloud network are both configured to perform an action on, or related to, the same packet traffic, the action may be performed twice. For example, if the NICs mirror the packet traffic (e.g., packet traffic with the same 5-tuple), a monitoring node (also referred to as a "collector") will receive a copy of the same packet traffic from each of the two NICs. Executing a mirroring task at both NICs consumes resources at both NICs and may require extra resources at the monitoring node to process both copies and possibly identify and remove one copy (an operation commonly known as deduplication), and/or may cause inaccuracies in the monitoring.

Thus, when there is a task (e.g., traffic mirroring) that may be executed on the same packet traffic by two different NICs in a network, it may be desirable to limit the task execution to only one of the NICs. In a small network with a limited number of nodes (and corresponding NICs) and/or a limited number of unique packet flows, the distribution of tasks amongst the NICs can be manually coordinated amongst the NICs by programming a unique task distribution rule into each NIC in the network. However, as networks (e.g., hyperscale cloud-based data centers) grow in size, complexity, and volume of traffic, manual coordination of task distribution amongst NICs can become difficult and resource intensive to implement.

SUMMARY

Methods and systems for autonomous rule-based task coordination amongst edge devices are disclosed. Embodiments of the present technology may include a method for processing packet traffic at an edge device, the method including determining a side of a communication that corresponds to an edge device with regard to packet traffic. Embodiments may also include applying a task distribution rule to the packet traffic using the determined side of the communication that corresponds to the edge device to determine if a particular task related to the packet traffic should be executed at the edge device. In some embodiments, the task distribution rule is configured to ensure that the particular task is executed at only one side of the communication.

In some embodiments, the edge device includes a host interface and a network interface. Embodiments may also include when the packet traffic is received on the host interface of the edge device, it is determined that the edge device corresponds to a source side of the communication. Embodiments may also include when the packet traffic is received on the network interface of the edge device, it is determined that the edge device corresponds to a destination side of the communication.

In some embodiments, the edge device includes a host interface and a network interface with a first port connected to a host and a second port connected to a switch. Embodiments may also include when the packet traffic is received on the first port of the network interface, it is determined that the edge device corresponds to a source side of the communication. Embodiments may also include when the packet traffic is received on the second port of the network interface, it is determined that the edge device corresponds to a destination side of the communication.

In some embodiments, determining a side of a communication that corresponds to the edge device includes examining a field in a header of the packet traffic. In some embodiments, the edge device includes a host interface and a network interface. In some embodiments, determining a side of the communication that corresponds to the edge device is a function of the interface corresponding to the packet traffic and a state of the field in the header.

In some embodiments, determining a side of a communication that corresponds to the edge device includes examining the SYN and ACK fields in a TCP header of the packet traffic. In some embodiments, the edge device includes a host interface and a network interface. In some embodiments, determining a side of the communication that corresponds to the edge device is a function of the interface corresponding to the packet traffic and a state of the SYN and ACK fields.

In some embodiments, the edge device includes a host interface and a network interface. In some embodiments, determining a side of the communication that corresponds to the edge device is a function of the interface corresponding to the packet traffic and a state of a field in a TCP header of the packet traffic. In some embodiments, the edge device includes a host interface and a network interface. In some embodiments, determining a side of the communication that corresponds to the edge device is a function of the interface corresponding to the packet traffic and a state of a field in a UDP header of the packet traffic.

In some embodiments, determining a side of a network that corresponds to the edge device includes examining a port number field in a UDP header of the packet traffic. In some embodiments, determining a side of a network that corresponds to edge device includes examining a field in an ICMP header of the packet traffic. In some embodiments, determining a side of a network that corresponds to edge device includes examining a type field in an ICMP header of the packet traffic.

In some embodiments, determining a side of a network that corresponds to edge device includes examining a field in an application layer header of the packet traffic. In some embodiments, edge device includes a table of local IP addresses and remote IP addresses. In some embodiments, determining a side of a network that corresponds to the edge device includes comparing at least one of a source IP address or a destination IP address of a received packet to the table.

In some embodiments, the edge device includes a host interface and a network interface. Embodiments may also include when the packet traffic is received on the host interface of the edge device, it is determined that the edge device corresponds to a source side of the communication.

Embodiments may also include when the packet traffic is received on the network interface of the edge device, it is determined that the edge device corresponds to a destination side of the communication. In some embodiments, application of the task distribution rule involves executing the particular task related to the packet traffic when the side that corresponds to the edge device is determined to be the source side and not executing the particular task related to the packet traffic when the side that corresponds to the packet traffic is determined to be the destination side.

In some embodiments, the edge device includes a host interface and a network interface. Embodiments may also include when the packet traffic is received on the host interface of the edge device, it is determined that the edge device corresponds to a source side of the communication. Embodiments may also include when the packet traffic is received on the network interface of the edge device, it is determined that the edge device corresponds to a destination side of the communication. In some embodiments, application of the task distribution rule involves executing the particular task related to the packet traffic when the side that corresponds to the edge device is determined to be the destination side and not executing the particular task related to the packet traffic when the side that corresponds to the packet traffic is determined to be the client side.

In some embodiments, the task distribution rule is a function of the side determination and some additional information related to the communication. Embodiments may also include determining that the packet traffic traverses two edge devices that are configured to execute the same task distribution rule. In some embodiments, determining that the packet traffic traverses two edge devices that are configured to execute the same task distribution rule involves providing host IP addresses to a central manager and receiving aggregated IP addresses from the central manager.

Embodiments may also include, at the edge device, determining an IP address of a host computer that corresponds to the edge device by inspecting the source IP address field of the IP header of a packet that is received at a host interface of the edge device. Embodiments may also include, at the edge device, receiving IP address information related to a host computer that corresponds to the edge device through a management interface. In an embodiment, the IP address information includes an IP prefix.

In some embodiments, determining that the packet traffic traverses two edge devices that are configured to execute the same task distribution rule involves embedding in-band signaling and extracting embedded in-band signaling at the edge device. In some embodiments, determining that the packet traffic traverses two edge devices that are configured to execute the same task distribution rule involves generating out-of-band signaling and identifying out-of-band signaling at the edge device.

Embodiments of the present technology may also include a method for processing packet traffic at an edge device, the method including determining that packet traffic traverses two edge devices that are configured to execute the same task distribution rule. Embodiments may also include when it is determined that the packet traffic does not traverse two edge devices that are configured to execute the same task distribution rule, executing a particular task related to the packet traffic. Embodiments may also include when it is determined that the packet traffic does traverse two edge devices that are configured to execute the same task distribution rule, 1) determining a side of a network that corresponds to edge device with regard to the packet traffic, and 2) applying a task distribution rule to the packet traffic using the determined side of the network that corresponds to the packet traffic to determine if a particular task related to the packet traffic should be executed at the edge device. In some embodiments, the task distribution rule is configured to ensure that the particular task is executed at only one of the two edge devices.

Embodiments of the present technology may also include a method for operating edge devices that are connected by a network, the method including at a first edge device. Embodiments may also include determining a side of a network that corresponds to the edge device with regard to a communication that involves packet traffic. Embodiments may also include applying a task distribution rule to the packet traffic using the determined side of the communication that corresponds to the edge device to determine if a particular task related to the packet traffic should be executed at the first edge device. Embodiments may also include at a second edge device. Embodiments may also include determining a side of the communication that corresponds to the edge device with regard to the packet traffic. Embodiments may also include applying the task distribution rule to the packet traffic using the determined side of the network that corresponds to the edge device to determine if the particular task related to the packet traffic should be executed at the second edge device. In some embodiments, the task distribution rule that is applied at the first and second edge devices is configured to ensure that the particular task is executed by either the first edge device of the second edge device, but not both edge devices.

Embodiments of the present technology may also include an edge device including packet traffic processor configured to, determine a side of a communication that corresponds to the edge device with regard to packet traffic. Embodiments may also include apply a task distribution rule to the packet traffic using the determined side of the communication that corresponds to the edge device to determine if a particular task related to the packet traffic should be executed at the edge device. In some embodiments, the task distribution rule is configured to ensure that the particular task is executed at only one side of the communication. In some embodiments, the edge device is a Network Interface Card.

Embodiments of the present technology may also include an integrated circuit device including a host interface. Embodiments may also include at least one network interface. Embodiments may also include logic configured to, determine a side of a communication that corresponds to the integrated circuit device with regard to packet traffic. Embodiments may also include apply a task distribution rule to the packet traffic using the determined side of the communication that corresponds to the integrated circuit device to determine if a particular task related to the packet traffic should be executed at the edge device. In some embodiments, the task distribution rule is configured to ensure that the particular task is executed at only one side of the communication.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 11 depicts an example of a table that may be stored at an edge device that includes both local IP addresses and remote IP addresses.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
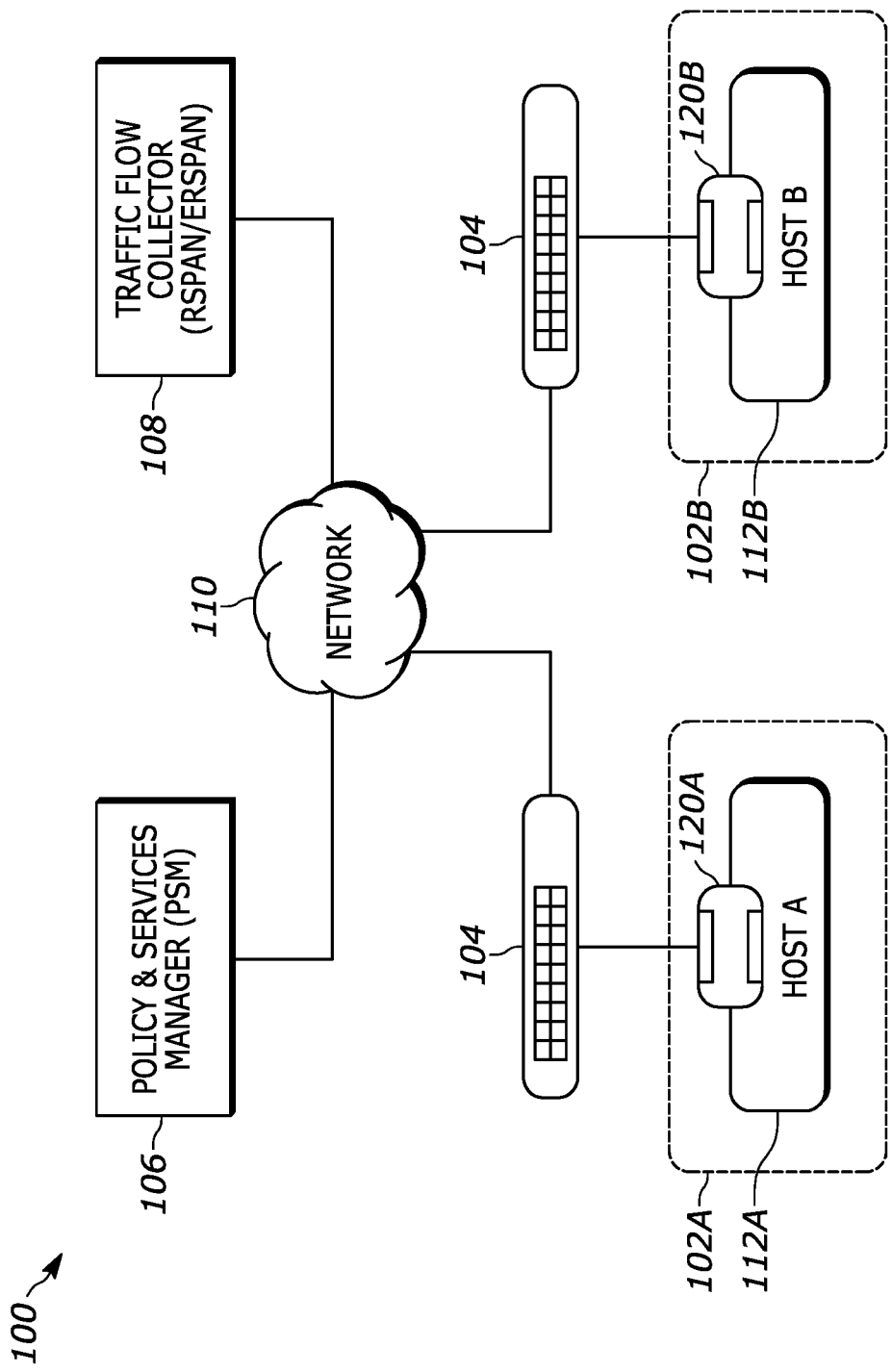
FIG. 1 depicts an example network architecture that includes two host computing systems.

FIG. 1 depicts an example network architecture 100 that includes host computing systems 102A and 102B, switches 104 (e.g., "Top-of-Rack" (ToR) switches), a Policy and Services Manager 106 (PSM), and a Traffic Flow Collector 108, which are all connected by a network 110. In an embodiment, the host computing systems include a host computer 112A and 112B and an edge device 120A and 120B, such as a Network Interface Card (NIC). The host computer may include a storage server, a computer server, a single processor, multiple processors, storage, primarily compute, and/or primarily storage.

In an embodiment, the ToR switches 104 are network switches that are commonly used to connect to servers in a data center. In at least one example, at least one switch is placed in a rack of servers and the servers in the rack are connected to the switch by copper wire cables, e.g., Ethernet cables. Although the switches are referred to herein as "ToR" switches, the switches may be deployed relative to host computers (e.g., servers) in other ways. For example, the switches may be "leaf" switches in a deployment that includes "spine" switches and leaf switches. In another example, the ToR switches may be routers or other general intermediate systems forwarding data between hosts in a global area network or other generic network.

In an embodiment, the PSM 106 is a computing system that manages and delivers network and security policy to the edge devices 120A and 120B for services implementation at the edge. The PSM may utilize gRPC and RESTful APIs to communicate with the edge device. The PSM enables distribution of network management information such as ACL and firewall security policies, network configuration, encryption policies, etc. to active edge device. In addition, the PSM can distribute network information, such as host IP addresses that are behind edge devices as part of an edge device discovery process as is described in more detail below. Although a PSM is shown in the example of FIG. 1, in other examples, there is not a PSM.

In an embodiment, the Traffic Flow Collector 108 receives mirrored packet traffic or traffic related telemetry data or other data computed by the NICs from the host computing systems 102A and 102B. The Traffic Flow Collector may be configured to collect and analyze packet traffic and other data received from the host computing systems. Although the example task described herein relates to port mirroring, the autonomous rule-based task coordination amongst edge devices is applicable to tasks other than port mirroring. Therefore, while the network architecture 100 of FIG. 1 includes a Traffic Flow Controller, in other examples, the Traffic Flow Collector, may not be present or there may be some other component that relates to the task that is being coordinated as described herein. Although the Traffic Flow Collector may support SPAN, RSPAN, and/or ERSPAN, these are just examples of tasks that may be implemented by the Traffic Flow Collector or by some other similarly situated network element. In other embodiments, a telemetry collectors or a flow information collector (e.g., NetFlow or IP Flow Information eXport (IPFIX)) may be in place of, or in addition to, the Traffic Flow Collector.

In an embodiment, the network architecture 100 is implemented as a data center network (DCN) that interconnects data center resources such as compute and storage servers. The DCN may utilize various data center architectures, such as, three-tier DCN, fat tree DCN, and DCell. Although in one example, the network is a DCN, the network that connects the host computing systems 102A and 102B, including the edge devices 120A and 120B may be another type of LAN and/or WAN. In an embodiment, a communication in the form of packet traffic is considered to traverse the network when the packet traffic travels from one host computing system that is connected to a first switch (e.g., a first ToR switch) to second host computing system that is connected to second switch (e.g., a second ToR switch). Although the network architecture shown in FIG. 1 is one example, the technique for autonomous rule-based task distribution is applicable to other network architectures.

Figure 2:
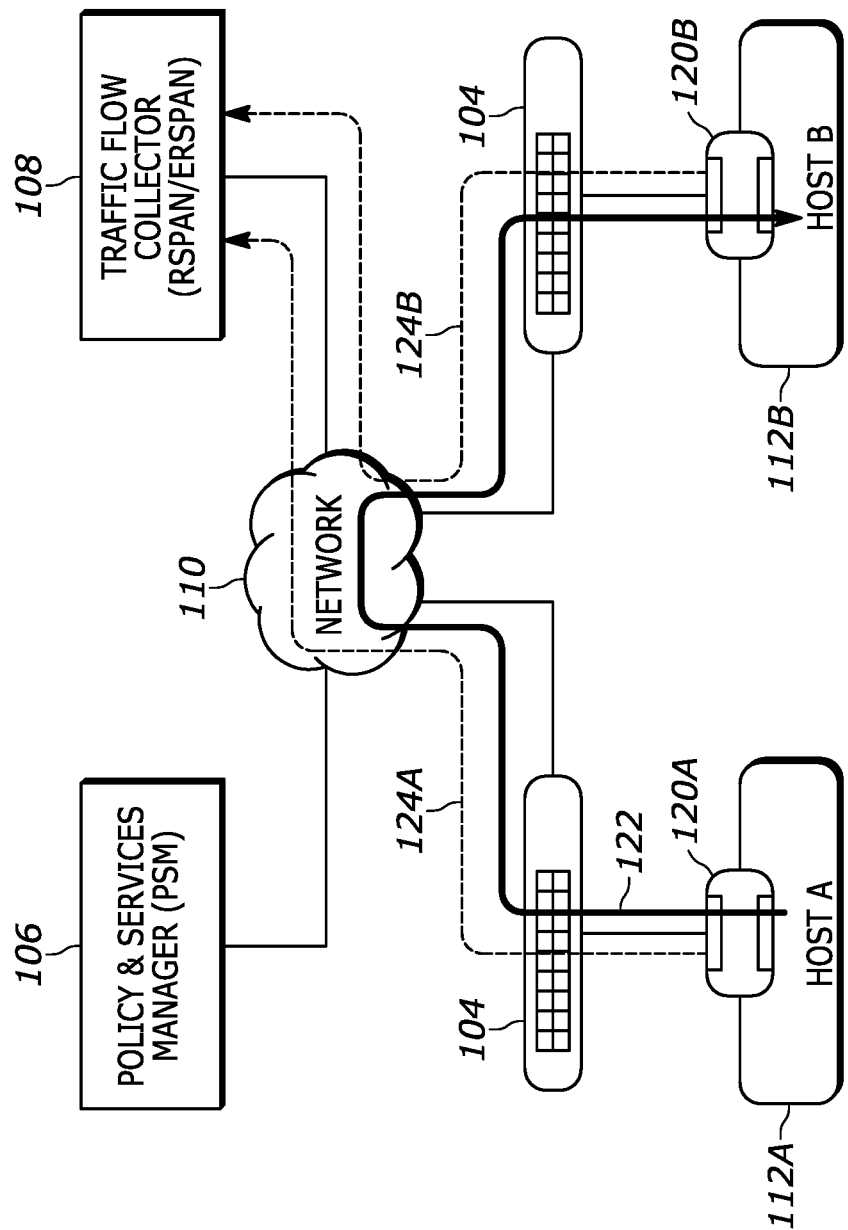
FIG. 2 illustrates a case in which a flow of packet traffic traverses across the network of FIG. 1.

In some use cases in the network architecture 100 described with reference to FIG. 1, it may be desirable to have the NICs 120A and 120B perform additional tasks such as port mirroring, which are not directly related to forwarding packet traffic through the network. For example, it may be desirable to direct the NICs to mirror all packet traffic from a particular flow, e.g., all traffic having the same 5-tuple. FIG. 2 illustrates a case in which a flow of packet traffic 122, e.g., packet traffic with the same 5-tuple, traverses across the network, e.g., west-to-east from host A 112A to host B 112B via NIC 120A and NIC 120B. FIG. 2 also illustrates that both NICs mirror the packet traffic such that mirrored packet traffic is provided to the Traffic Flow Collector 108 from both of the NICs. In particular, mirrored packet traffic transmitted from NIC 120A is represented by dashed-line arrow 124A and mirrored packet traffic transmitted from NIC 120B is represented by dashed-line arrow 124B. As illustrated in FIG. 2, the Traffic Flow Collector receives a copy of the same packet traffic from both NIC 120A and NIC 120B. Receiving the same packet traffic from both NICs may be undesirable when the Traffic Flow Collector is trying to generate statistics (e.g., transmission rate, total traffic volume, etc.) that represent the actual packet traffic being communicated from host A to host B. For example, the generated statistics may not be accurate or extra resources may be expended to ensure that the statistics do not double count the same packet traffic, e.g., to implement deduplication.

To prevent both NICs 120A and 120B from mirroring the same packet traffic to the Traffic Flow Collector 108, each NIC could be manually configured by a network administrator with a NIC-specific mirroring rule such that NIC 120A is manually configured to mirror the particular flow of packet traffic and NIC 120B is manually configured to not mirror the particular flow of packets traffic. While the manual approach to task distribution may work in a relatively small network with a limited number of unique flows, the manual approach may not scale well.

In accordance with an embodiment of the invention, processing packet traffic at an edge device, such as a NIC, involves determining a side of a communication that corresponds to an edge device with regard to the packet traffic and then applying a task distribution rule to the packet traffic using the determined side of the communication that corresponds to the edge device to determine if a particular task related to the packet traffic should be executed at the edge device, wherein the task distribution rule is configured to ensure that the particular task is executed at only one side of the communication. Because the execution of a task at an edge device is a function of a side determination, which is made at each edge device, the same task distribution rule can be applied at each edge device that corresponds to a communication so that each edge device does not need to be manually configured with a device-specific task distribution rule. Such a technique enables each edge device to autonomously make a determination regarding execution of a particular task while ensuring that execution of the particular task is not duplicated by two edge devices. In an embodiment, the side determination made at each edge device involves determining if the local host is on the source side or on the destination side of the communication or determining if the local host is the client or the server in a client/server communication. For example, a source/destination determination can be made based on knowledge of an interface of the edge device on which the packet traffic is received and a client/server determination can be made based on inspecting the header information at the transport layer. In one example, a task determination rule applied at both NICs in an east-to-west communication of packet traffic may designate that a particular task is to be executed only by a NIC that is on the source side of the communication and so execution of the task distribution rule by the NIC on the source side of the communication results in the particular task being executed by the source side NIC while application of the same task distribution rule by the NIC on the destination side of the communication results in the particular task not being executed by the destination side NIC. Thus, responsibility for executing the particular task is coordinated between the two NICs on opposite sides of the communication without the two NICs having to be uniquely programmed and without the two NICs having to communicate with each other to coordinate responsibility for execution of the task. In some embodiments, task distribution rules can be a function of the determined side and some additional piece of information related to the packet traffic to implement more intelligent, or advanced, task distribution logic. For example, task distribution rules can also be a function of header data such that the execution of tasks related to multiple different flows of packet traffic is distributed amongst the NICs on both sides of a communication so that one of the NICs does not execute all of the tasks while the other NIC executes none of the tasks. For example, it may be desirable to share the responsibility of mirroring multiple different flows amongst the NICs on opposite sides of a communication so that some of the flows are mirrored by the source side NIC while others of the flows are mirrored by the destination side NIC. Such autonomous rule-based task distribution amongst edge devices is well suited for networks that handle high volumes of packet traffic.

Figure 3:
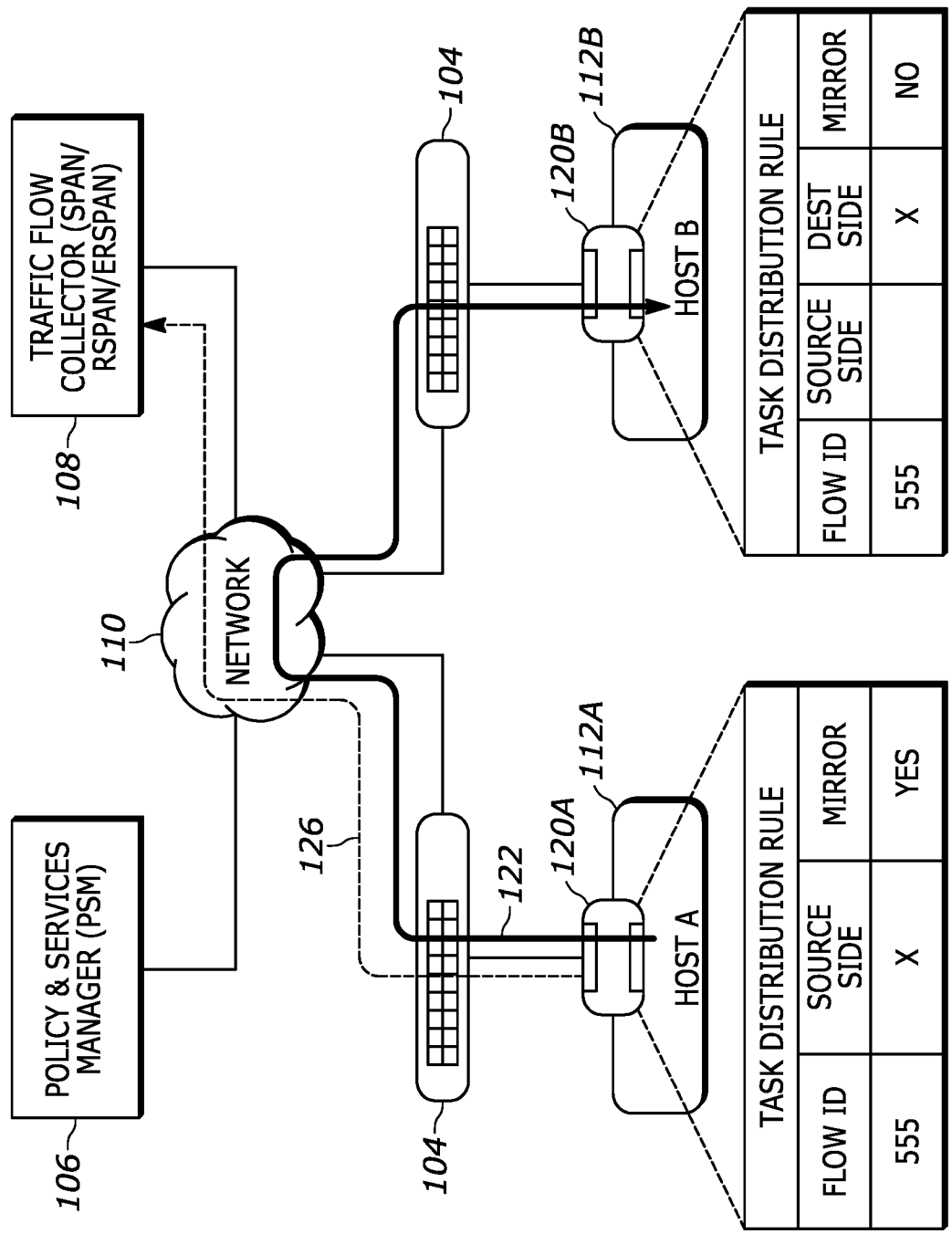
FIG. 3 illustrates a case in which a communication in the form of a flow of packet traffic traverses across a network similar to FIG. 2 except that the NICs implement autonomous rule-based task distribution in accordance with an embodiment of the invention to ensure that only one of the NICs executes the task of port mirroring on the packet traffic.

FIG. 3 illustrates a case in which a communication in the form of a flow of packet traffic 120 traverses across the network 110, e.g., west-to-east from host A 112A to host B 112B via NIC 120A and NIC 120B, similar to FIG. 2 except that the NICs implement autonomous rule-based task distribution in accordance with an embodiment of the invention to ensure that only one of the NICs executes the task of port mirroring on the packet traffic. In the example of FIG. 3, each NIC is configured with a task distribution rule that dictates that only the source side NIC executes the particular task (e.g., port mirroring) on the flow of packet traffic. A pseudo-code expression of the task distribution rule executed at both NICs may be:

if flowID=match, and
source side=yes,
then, execute minoring.

With reference to the NIC 120A connected to host A 112A, the NIC has determined that it is on the source side of the communication with regard to the flow of packet traffic having flowID=555 as indicated by the "X" in the source side column of the task distribution rule. The NIC may also determine that host B is on the destination side of the network although such a determination is not required in this example. Given that the NIC connected to host A has determined that it is on the source side of the communication with regard to the flow (flowID=555), application of the task distribution rule provided above dictates that the task of mirroring should be executed by the NIC (NIC 120A). FIG. 3 illustrates that the source side NIC is executing the task of mirroring as indicated by the "YES" in the mirror column of the task distribution rule and by the dashed line arrow 126. With regard to the NIC 120B connected to host B 112B, the NIC 120B has determined it is on the destination side of the communication with regard to the same flow of packet traffic, e.g., the flow having flowID=555 as indicated by the "X" in the destination side column of the task distribution rule. The NIC may also determine that host A is on the source side of the communication although such a determination is not required in this example. Given that the NIC 120B connected to host B 112B has determined that it is on the destination side of the communication with regard to the flow (flowID=555), application of the task distribution rule provided above dictates that the task of minoring should not be executed by the NIC (NIC 120B). FIG. 3 is provided as an example of the application of autonomous rule-based task distribution amongst edge devices. Details related to the side determination and examples of task determination rules are described below. Additionally, while a particular example of the form of the task distribution rule is provided in FIG. 3, task distribution rules may be maintained in other forms. For example, each edge device may maintain a list of flows (as flowIDs) and whether the flowID corresponds to the source side or to the destination side of the communication.

Figure 4:
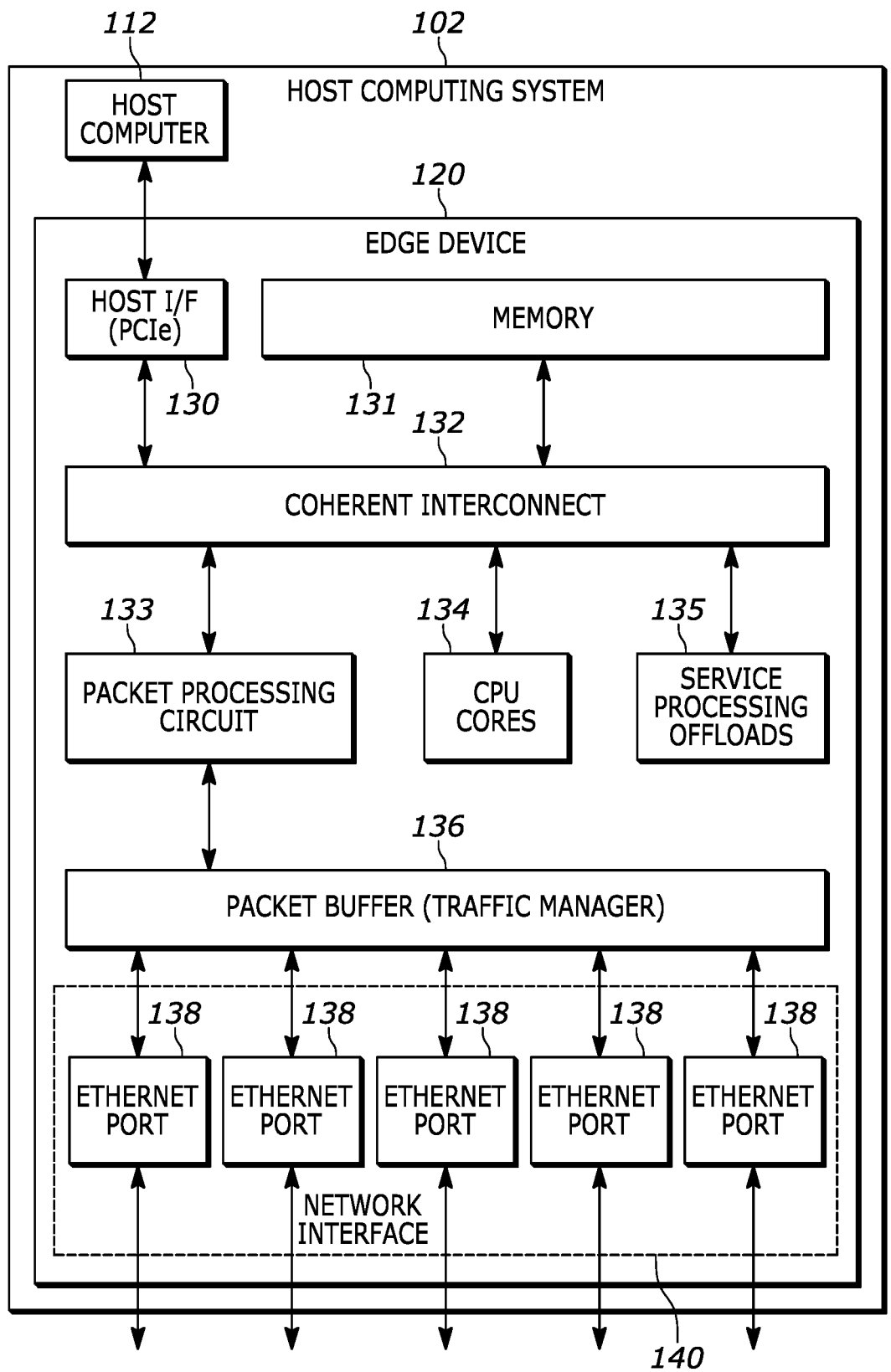
FIG. 4 depicts an example embodiment of an edge device that is configured to implement autonomous rule-based task determination amongst edge devices.

FIG. 4 depicts an example embodiment of an edge device 120 that is configured to implement autonomous rule-based task determination amongst edge devices. The edge device is shown relative to a host computer 112, in which the edge device and host computer form a host computing system 102. In the embodiment of FIG. 4, the edge device is a NIC (also referred to as a "SmartNIC") that is configured to operate within the host computing system in which the host computer provides storage and/or compute resources. In other embodiments, the edge device may be single IC device, such as packet processor IC device, in which case the edge device may not include certain elements such as physical layer (PHY) elements (e.g., PHY transmitters/receivers and port connectors), additional memory, power management etc., which are typically part of a NIC. In another embodiment, the edge device can be a network node, separated from the host, but directly (e.g., via a ToR switch) or indirectly (e.g., via some other switch or router in the network in the vicinity of the host) attached to the host through a network interface (e.g., an Ethernet interface) and the network.

In the example of FIG. 4, the edge device 120 includes a host interface 130 and a network interface 140 along with a memory 131, a coherent interconnect 132, a packet processing circuit 133, CPU cores 134, service processing offloads 135, and a packet buffer 136. Although an example architecture of the edge device is described with reference to FIG. 4, other architectures of the edge device are possible.

In an embodiment, the host interface 130 of the edge device 120 is a PCIe interface that provides a high speed connection to the host computer 112 and the network interface 140 includes multiple ports, such as Ethernet ports 138, that enable the edge device to communicate with other computing systems via network connections. In an embodiment in which the edge device is a NIC, the PCIe interface may include a PCIe port with a physical layer (PHY) interface and connector, and the Ethernet ports may include physical layer Ethernet ports and connectors, which may be, for example, optical PHY ports and/or twisted-pair PHY ports. In an embodiment in which the edge device is a single IC device, the host interface may include pins on the IC device that correspond to a PCIe physical interface and the network interface may include pins on the IC device that correspond to MAC level Ethernet communications.

The memory 131 of the edge device 120 can include memory for running Linux or some other operating system, memory for storing data structures such as flow tables, statistics, and other analytics, and memory for providing buffering resources for advanced features including TCP termination and proxy, deep packet inspection, and storage offloads. The memory may include a high bandwidth module (HBM) that may support, for example, 4 GB capacity, 8 GB capacity, or some other capacity depending on package and HBM. Memory transactions in the edge device, including host memory, on board memory, and registers may be connected via the coherent interconnect 132. In one nonlimiting example, the coherent interconnect can be provided by a network on a chip (NOC) "IP core".

Semiconductor chip designers may license and use prequalified IP cores within their designs. Prequalified IP cores may be available from third parties for inclusion in IC devices produced using certain semiconductor fabrication processes.

In an embodiment, the packet processing circuit 133 implements a programmable packet processing pipeline that is programmable using a domain-specific language. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "$P4_{16}$ Language Specification," version 1.2.0, as published by the P4 Language Consortium on Oct. 23, 2019, which is incorporated by reference herein. P4 (also referred to herein as the "P4 specification," and the "P4 language") is designed to be implementable on a large variety of targets including programmable NICs, software switches, hardware switches, FPGAs, and ASICs. As described in the P4 specification, the primary abstractions provided by the P4 language relate to header types, parsers, tables, actions, match-action units, control flow, extern objects, user-defined metadata, and intrinsic metadata. The packet processing pipeline in the edge device may include an arbiter, a parser, a match-action pipeline, a deparser, and a demux/queue that constitute a P4 programmable NIC, a P4 programmable packet processor IC device, or some other architecture. The arbiter can act as an ingress unit receiving packets from RX-MACs and can also receive packets from a control plane via a control plane packet input. The arbiter can also receive packets that are recirculated to it by the demux/queue. The demux/queue can act as an egress unit and can also be configured to send packets to a drop port (the packets thereby disappear), to the arbiter via recirculation, and to the control plane via an output CPU port or via the coherent interconnect 132. The control plane is often referred to as a CPU (central processing unit) although, in practice, control planes often executes on multiple CPU cores and other elements. The arbiter and the demux/queue can be configured through the domain-specific language (e.g., P4).

In an embodiment, the CPU cores 134 are general purpose processor cores, such as ARM processor cores, Microprocessor without Interlocked Pipeline Stages (MIPS) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

The service processing offloads 135 are specialized hardware modules purposely optimized to handle specific tasks at wire speed, such as cryptographic functions, compression/decompression, etc.

The packet buffer 136 can act as a central on-chip packet switch that delivers packets from the network interfaces 140 to packet processing elements of the edge device 120 and vice-versa.

In an embodiment, the edge device 120 has the ability to identify which interface packet traffic is received on and/or transmitted from. For example, for a particular packet, the edge device can identify whether the packet was received on the host interface 130 or received on the network interface 140, including which particular port 138 of the network interface. Likewise, the edge device can identify whether a packet is sent or transmitted out the host interface or transmitted out the network interface, including which particular port of the network interface. As is described in more detail below, the ability of the edge device to identify an interface and port that corresponds to particular packet traffic is important in making a side determination with regard to that particular packet traffic.

Figure 5A:
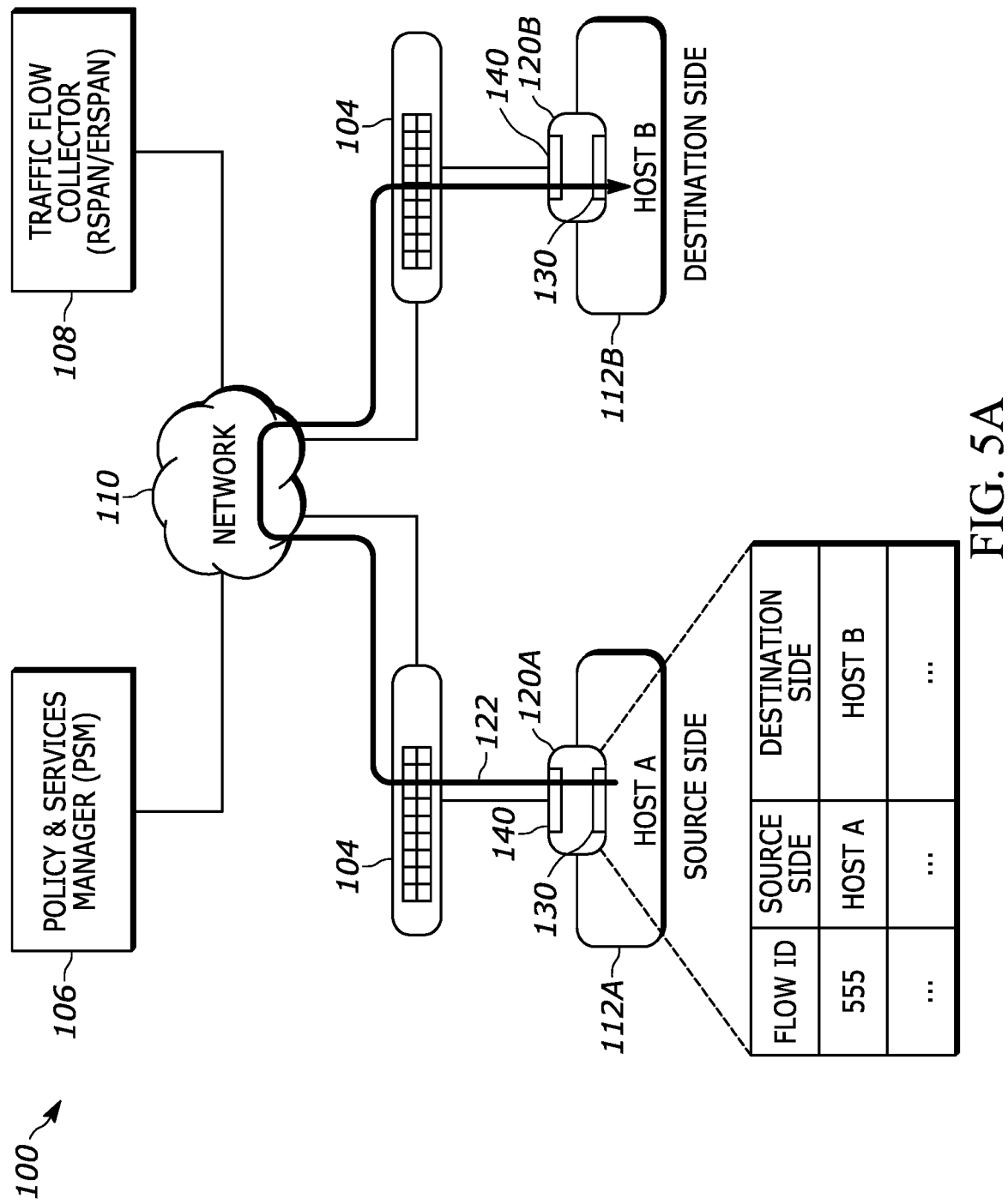
FIGS. 5A and 5B illustrate examples of how the interface on which packet traffic is received at an edge device can be used by the edge device to determine a side of the communication that corresponds to the edge device with regard to the packet traffic.
Figure 5B:
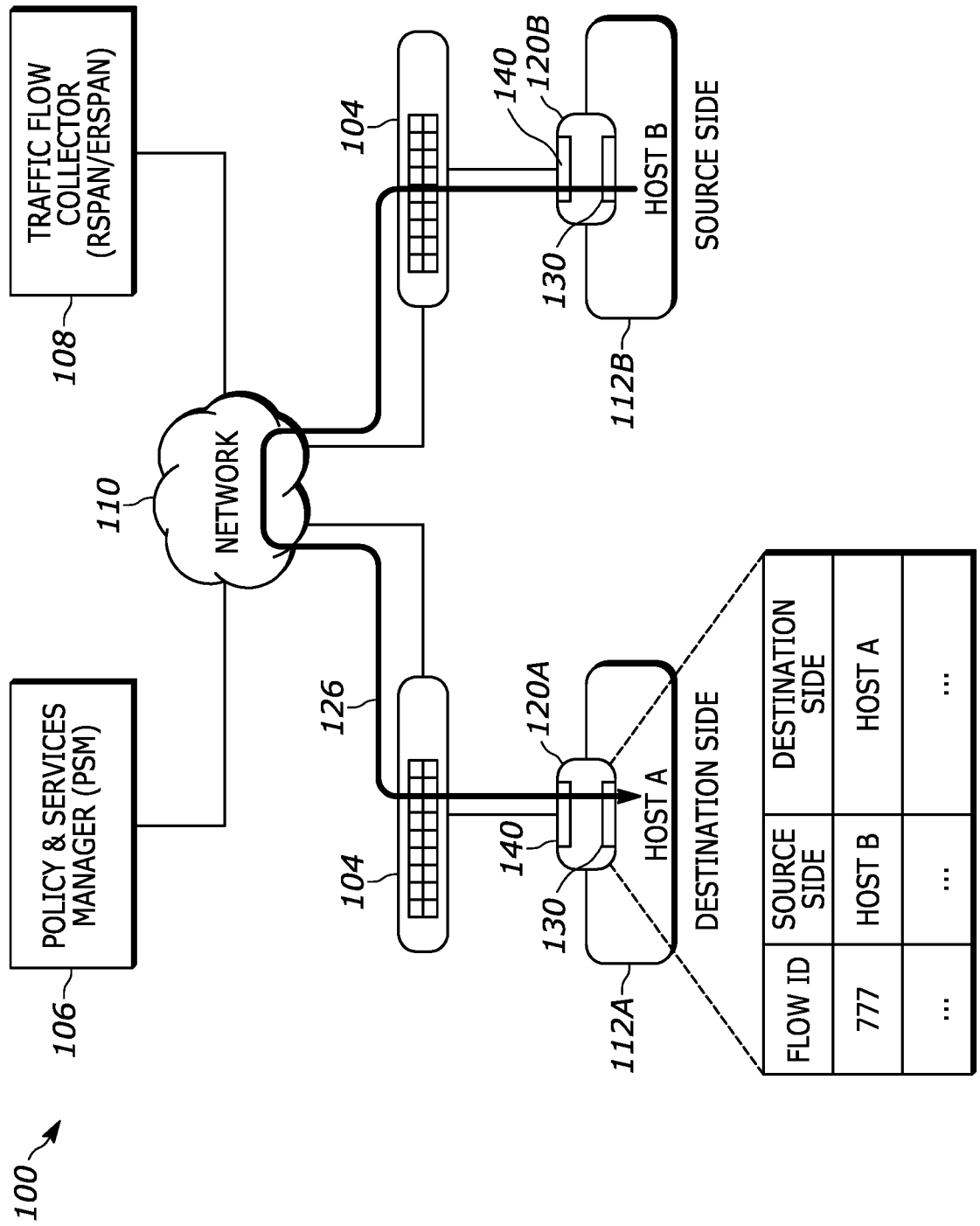

As described above with reference to FIG. 4, the edge device 120 (e.g., a NIC) can identify whether packet traffic of a communication is received on the host interface 130 or received on the network interface 140. The interface on which packet traffic is received, or transmitted, can be used to determine a side of the communication that corresponds to the edge device with regard to a particular packet or with regard to a particular flow of packet traffic. FIGS. 5A and 5B illustrate examples of how the interface on which packet traffic is received at an edge device can be used by the edge device to determine a side of the communication that corresponds to the edge device with regard to the packet traffic. With reference to FIG. 5A, a flow of packet traffic 122 (flowID=555) has a source of host A 112A and a destination of host B 112B. At the NIC 120A connected to host A, the packet traffic is received at the host interface 130 of the NIC and transmitted from the network interface 140 of the NIC and the NIC is configured to consider packet traffic that is received at the host interface to have host A as its source and thus the edge device determines that it is on the source side of the communication with respect to the packet traffic. The edge device may also note for learning purposes that host B is on the destination side of the communication although such a determination may not be necessary depending on the task distribution rule. For example, the edge device may identify and save the destination IP address of a packet header of the outgoing packet traffic. As illustrated in FIG. 5A, based on the distinction between the host interface and the network interface of the edge device and the recognition of the interface on which the packet traffic was received, the edge device is able to make a side determination, e.g., a distinction between a source side and a destination side of the communication, which corresponds to the edge device relative to a specific flow of packet traffic.

Turning now to FIG. 5B, a flow of packet traffic 126 (e.g., flowID=777) has a source of host B 112B and a destination of host A 112A. At the NIC 120A connected to host A, the packet traffic is received at the network interface 140 of the NIC and the NIC is configured to consider packet traffic that is received at the network interface to have host A as its destination and thus the edge device determines that it is on the destination side of the communication with regard to the packet traffic and/or that it is not on the source side of the communication. The edge device 120A may also note for learning purposes that host B 112B is on the source side of the communication although such a determination may not be necessary depending on the task distribution rule. Again, based on the distinction between the host interface 130 and the network interface 140 of the edge device and the recognition of the interface on which the packet traffic was received, the edge device is able to make a side determination, e.g., a distinction between a source side and a destination side of the communication, which corresponds to the edge device relative to a specific flow of packet traffic.

As illustrated through the examples of FIGS. 5A and 5B, the side of a communication can be determined at an edge device based on knowledge of the interface on which the packet traffic is received at the edge device. As is described in more detail below, each edge device can then apply the same task distribution rule using such a side determination in a manner that ensures that a particular task (e.g., mirroring) is executed at only one side of the network for a particular flow of packet traffic.

FIGS. 5A and 5B illustrate examples in which the edge devices 120A and 120B on both sides of the network are NICs that are connected directly to a host such as a storage server and/or a compute server. However, the edge devices on opposite sides of the network 110 may be deployed in other ways relative to a host, which may affect the side determination. Various different deployments of an edge device or edge devices relative to a host (e.g., host A), and corresponding side determination logic are described below with reference to FIGS. 6A-6F.

Figure 6A:
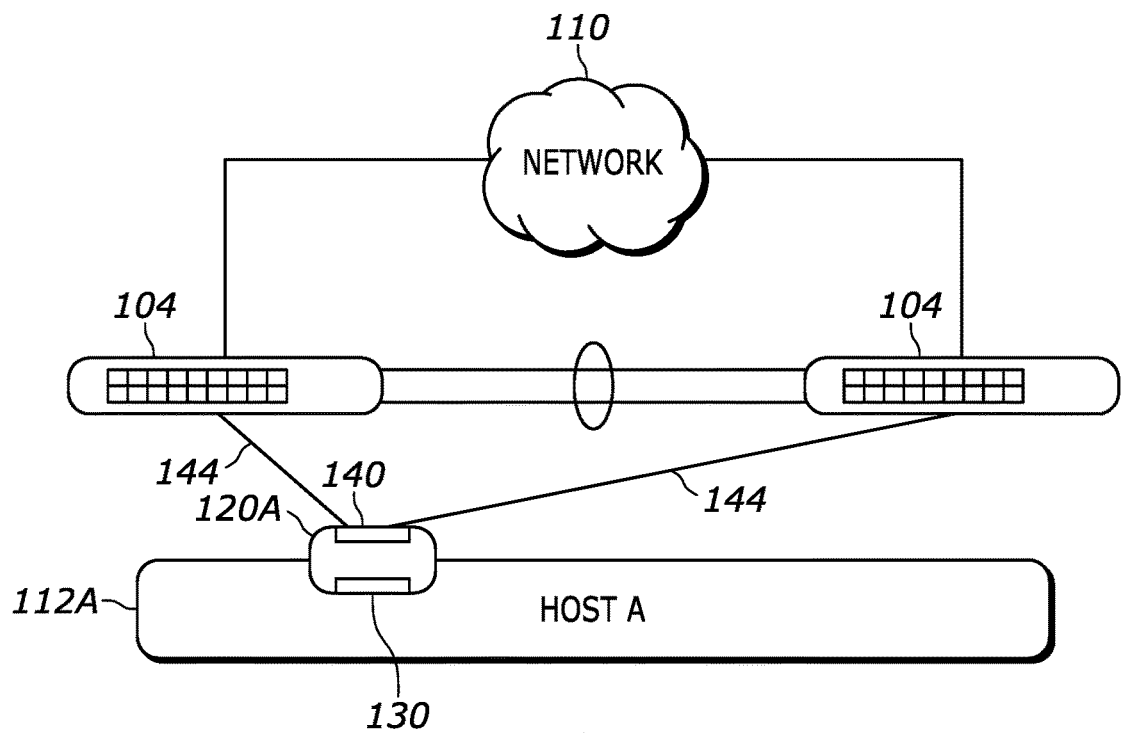
FIG. 6A depicts a dual interconnection and single edge device deployment relative to a host.

FIG. 6A depicts a dual interconnection and single edge device (e.g., a NIC) deployment relative to a host (e.g., host A 112A). In this example, there are two physical transmission media 144 (e.g., optical fiber or twisted-pair wire) connected to two separate ports of the network interface 140 of the NIC 120A and to first and second ToR switches 104, in which both ToR switches are connected to the network. For example, with reference to FIG. 4, there is a first transmission media plugged into a first Ethernet port 138 of the network interface 140 of the NIC 120, which is connected to the first ToR switch, and a second transmission media plugged into a second Ethernet port of the network interface, which is connected to the second ToR switch. With regard to side determination, in an embodiment, the NIC is configured to determine that packet traffic received at the NIC on the host interface corresponds to the source side of a communication and that traffic received at the NIC on either one of the ports of the network interface corresponds to the destination side of the communication.

Figure 6B:
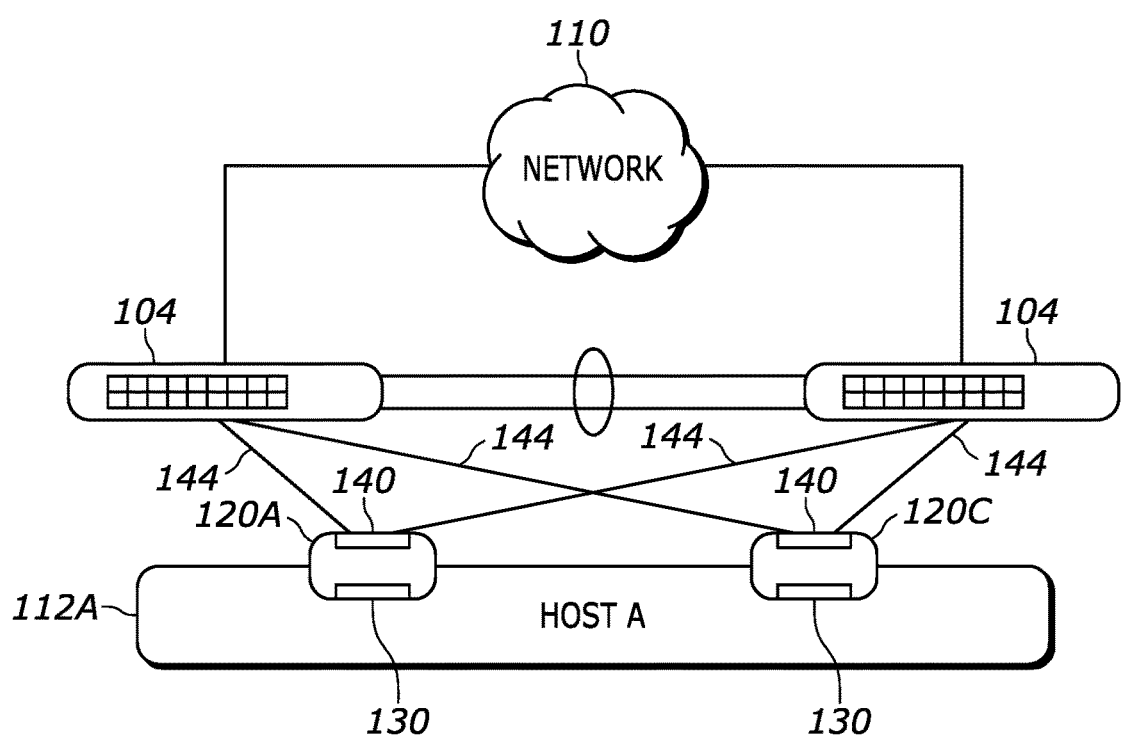
FIG. 6B depicts a dual interconnection and dual edge device deployment relative to a host.

FIG. 6B depicts a dual interconnection and dual edge device deployment relative to a host (e.g., host A). In this example, there are two NICs 120A and 120B connected to host A 112A and each NIC has two transmission media 144 connected to two separate ports of the corresponding network interface 140. For example, with reference to FIG. 4, there is a first transmission media plugged into a first Ethernet port 138 and connected to a first ToR switch and a second transmission media plugged into a second Ethernet port of the first NIC and connected to a second ToR switch, and a third transmission media plugged into a first Ethernet port and a fourth transmission media plugged into a second Ethernet port of the second NIC, which are connected to the first and second ToR switches, respectively. With regard to the side determination, in an embodiment, both NICs are configured to determine that packet traffic received on the host interface of either of the two NICs corresponds to the source side of a communication and that packet traffic received on any one of the ports (e.g., Ethernet ports) of the network interfaces of the two NICs corresponds to the destination side of the communication.

Figure 6C:
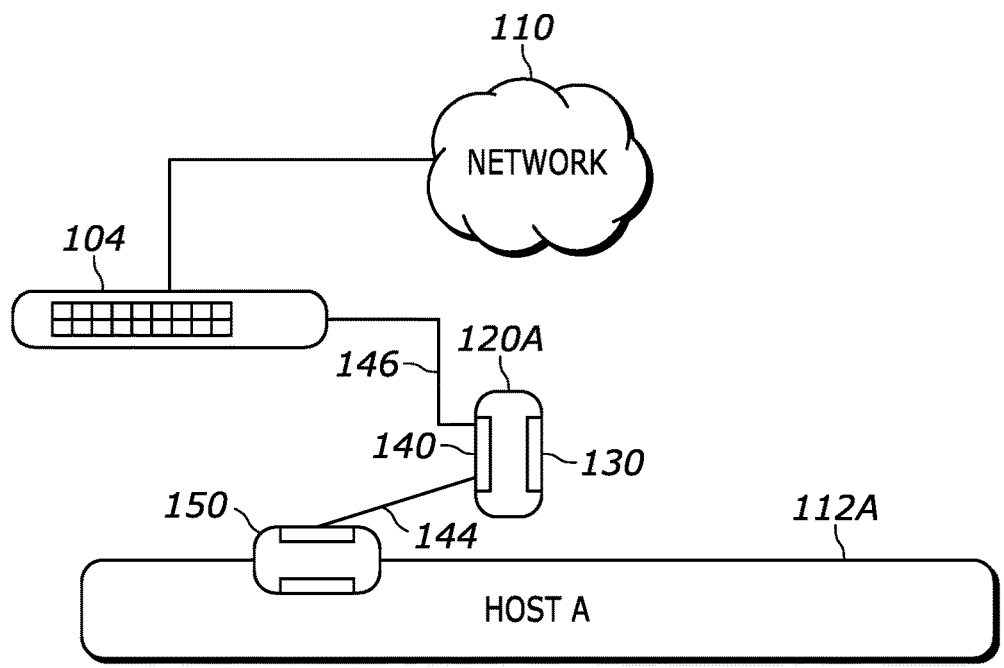
FIG. 6C depicts a single NIC, single interconnection "bump-in-the-wire" (BITW) deployment relative to a host.

FIG. 6C depicts a single NIC, single interconnection "bump-in-the-wire" (BITW) deployment relative to a host (e.g., host A 112A) in which a NIC 150 directly connected to host A is not configured to implement autonomous rule-based task distribution amongst edge devices as described herein but a BITW device includes an edge device 120A, such as a NIC, a switch, or other network node, that is configured to implement autonomous rule-based task distribution amongst edge devices as described herein. In an embodiment, a BITW device is a device (e.g., a NIC, switch, or other network node) that is inserted in the communications path of the communication, and may be integrated into an existing (e.g., legacy) device or it may be a standalone device. In the example of FIG. 6C, a first transmission media 144 is connected from the NIC that is connected to host A to a first port of the network interface 140 of the edge device 120A in the BITW device and a second transmission media 146 is connected from a second port of the network interface 140 of the edge device in the BITW device to a Top-of-Rack (ToR) switch 140, which is connected to the network 110. In the deployment of FIG. 6C, the first port of the network interface 140, which is connected to the host A NIC 150, and the second port of the network interface 140, which is connected to the ToR switch 104, are identified upon deployment of the NIC and the edge device is configured so that the edge device knows that the first port (e.g., Ethernet port 1 of the network interface) is connected to the host (e.g., host A) and that the second port (e.g., Ethernet port 2 of the network interface) is connected to the ToR switch. Further, the edge device 120A is configured to know that packet traffic received on the host connected port of the network interface (e.g., the first port, Ethernet port 1) corresponds to the source side of a communication and that packet traffic received on the ToR switch connected port (e.g., the second port, Ethernet port 2) of the network interface corresponds to the destination side of the communicate.

Figure 6D:
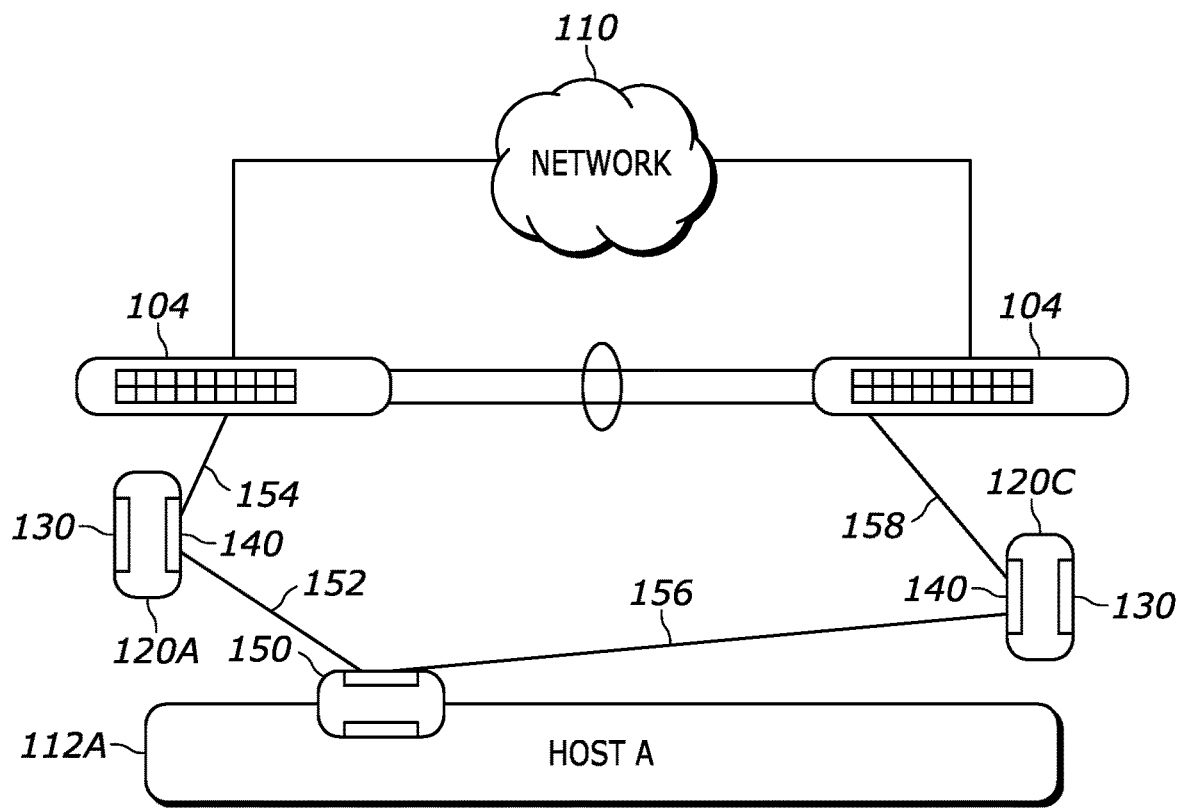
FIG. 6D depicts a single NIC, dual interconnection BITW deployment relative to a host.

FIG. 6D depicts a single NIC, dual interconnection BITW deployment relative to a host (e.g., host A) in which the NIC 150 connected to host A 112A is not configured to implement autonomous rule-based task distribution amongst edge devices as described herein but two BITW devices each include an edge device 120A and 120C, such as a NIC, that is configured to implement autonomous rule-based task distribution amongst edge devices as described herein. In the example of FIG. 6D, a first transmission media 152 is connected from a first port of the NIC 150 that is connected to host A to a first port of the network interface 140 of the first edge device 120A and a second transmission media 154 is connected from a second port of the network interface 140 of the first edge device 120A to a first ToR switch 104, which is connected to the network 110. Likewise, a third transmission media is connected from another port of the NIC that is connected to host A to a port of the network interface of the second edge device and a fourth transmission media is connected from a second port of the network interface of the second edge device to a second ToR switch, which is connected to the network. In the deployment of FIG. 6D, with regard to the first edge device120A, the port of the network interface connected to the host A NIC 150 and the port of the network interface connected to the first ToR switch are identified upon deployment and configured within the first edge device so that the first edge device knows that a particular port (e.g., Ethernet port 1 of the network interface) is connected to the host and that a particular other port (e.g., Ethernet port 2 of the network interface) is connected to the first ToR switch. Likewise, with regard to the second edge device 120C, the port of the network interface 140 connected to the host A NIC 150 and the port of the network interface connected to the second ToR switch are identified upon deployment and configured within the second edge device so that the second edge device knows that a particular port (e.g., Ethernet port 1 of the network interface) is connected to the host and that a particular other port (e.g., Ethernet port 2 of the network interface) is connected to the second ToR switch. Further, the first and second edge devices are configured to know that packet traffic received on the respective host connected port of the respective network interface corresponds to the source side of a communication and that packet traffic received on the respective ToR switch connected port of the respective network interface corresponds to the destination side of the communication.

Figure 6E:
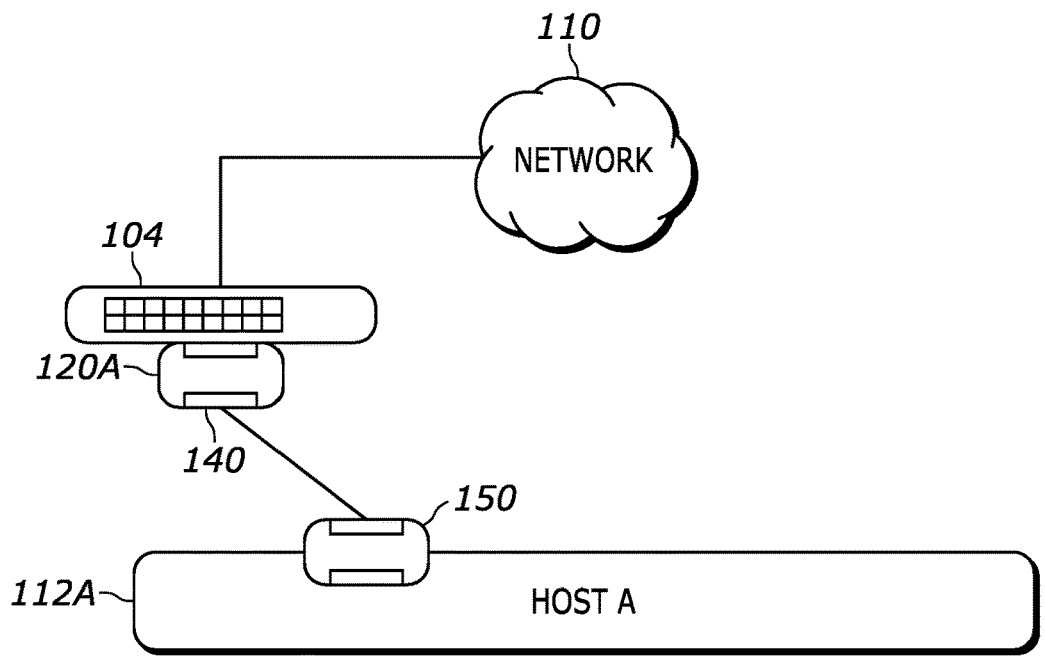
FIG. 6E depicts a single interconnection Top-of-Rack switch deployment of an edge device relative to a host.

FIG. 6E depicts a single interconnection ToR switch deployment of an edge device relative to a host (e.g., host A) in which the NIC 150 connected to the host (host A 112A) is not configured to implement autonomous rule-based task distribution amongst edge devices as described herein but an edge device 120A integrated into a ToR switch 104 is configured to implement autonomous rule-based task distribution amongst edge devices as described herein. In the example of FIG. 6E, the edge device may be in the form of a NIC or an IC device (e.g., without additional support elements of a NIC, e.g., PHY elements, additional memory, power management etc.) that is integrated into the ToR switch. In an IC deployment, at least one port/interface of the edge device is connected to the host (host A) and at least one other port/interface of the edge device is connected to an interface of the ToR switch, which is connected to the network (e.g., connected to the data center fabric). In the deployment of FIG. 6E, the port/interface of the edge device connected to the host A NIC 150 and the port/interface of the edge device connected to an uplink interface of the ToR switch are identified upon deployment and configured within the edge device so that the edge device knows that a particular port/interface (e.g., Ethernet port 1/pins in an IC device) is connected to the host and that a particular other port/interface (e.g., Ethernet port 2/pins on the IC device) is connected to an uplink of the ToR switch. Further, the edge device embedded in the ToR switch is configured to know that packet traffic received on the host-connected port/interface (e.g., Ethernet port 1) corresponds to the source side of a communication (e.g., the source IP address in the IP header corresponds to an IP address of host A) and packet traffic received on an uplink connected port/interface (e.g., Ethernet port 2) corresponds to the destination side of the communication.

Figure 6F:
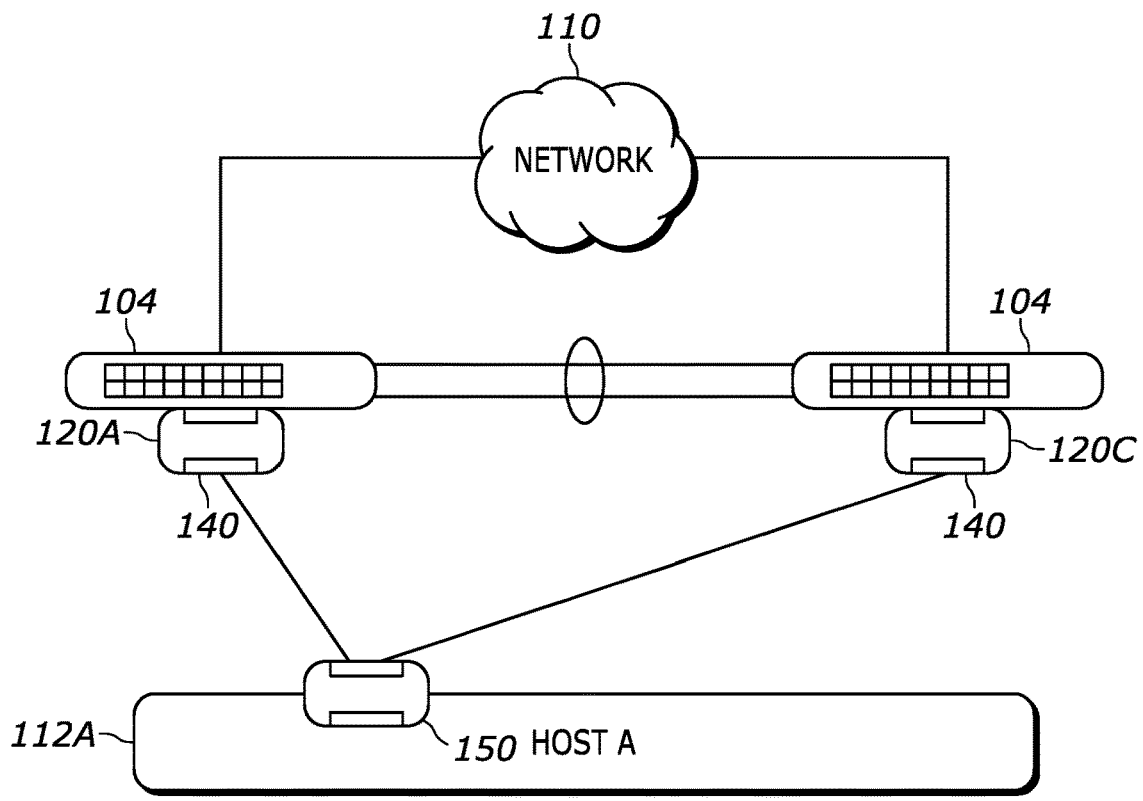
FIG. 6F depicts a dual interconnection ToR switch deployment of two edge devices relative to a host.

FIG. 6F depicts a dual interconnection ToR switch deployment of two edge devices relative to a host (e.g., host A) in which the NIC 150 connected to the host is not configured to implement autonomous rule-based task distribution amongst edge devices as described herein but an edge device integrated into each of two ToR switches is configured to implement autonomous rule-based task distribution amongst edge devices as described herein. In the example of FIG. 6F, the edge devices may be in the form of a NIC an IC device (e.g., without additional support elements of the NIC, e.g., PHY elements, additional memory, power management etc.) that is integrated into each ToR switch. In an IC deployment, at least one port/interface of both edge devices is connected to the host (host A) and at least one other port/interface of the edge device is connected to an interface of the respective ToR switch, which ToR switches are both connected to the network (e.g., connected to the data center fabric). In the deployment of FIG. 6F, for each edge device, the port/interface 140 of the edge device connected to the host A NIC 150 and the port/interface 130 of the edge device connected to an uplink interface of the respective ToR switch are identified upon deployment and configured within the edge devices so that the edge devices know that a particular port/interface (e.g., Ethernet port 1/pins of the IC device) is connected to the host and that a particular other port/interface (e.g., Ethernet port 2/pins of the IC device) is connected to an uplink of the respective ToR switch. Further, the edge device embedded into each ToR switch is configured to know that packet traffic received on the host connected port of the network interface corresponds to the source side of a communication and that packet traffic received on an uplink connected port of the network interface corresponds to the destination side of the communication.

As described with reference to FIGS. 4-6F, the interface on which packet traffic is received at an edge device can be used to determine a side of a communication (e.g., source side or destination side) that corresponds to the packet traffic. In an embodiment, an edge device is configured with side determination logic upon deployment. For example, the edge device is configured with side determination logic that corresponds to the particular deployment of that particular edge device. The side determination logic may reflect the side determination logic described above with regard to FIGS. 3-6F in which the particular orientation of the interfaces of the edge device relative to the local host dictates the appropriate side detection logic. In an embodiment, the side determination logic may be deployment-specific such that there is pre-programmed side determination logic for NIC, BITW, and ToR switch deployments as described above. The specific configuration of an edge device may then be selected from the available options of deployment specific side determination logic.

In the examples described above, a side determination is a function of the interface, host interface or network interface, on which packet traffic is received or transmitted. Such a side determination involves characterizing the sides of a communication as either source side or the destination side. In another embodiment, a side determination may be made as a function of an interface and some additional packet information such as transport layer (Layer 4) header information. Such a side determination involves characterizing the sides of the network as either the client side or the server side. As is known in the field of packet-based communications between computing systems, many communications rely on a client-server paradigm. In an embodiment, knowledge of client-server communications can be leveraged so that edge devices can autonomously determine a side of the network that corresponds to packet traffic. For example, an edge device can autonomously determine whether packet traffic corresponds to a client side of the network or to a server side of the network based on the receive and/or transmit interface and some header information corresponding to the packet traffic. For example, the header information may be transport layer header information found in a TCP, UDP, or ICMP header. Examples of such a client/server side determination are described below.

Figure 7A:
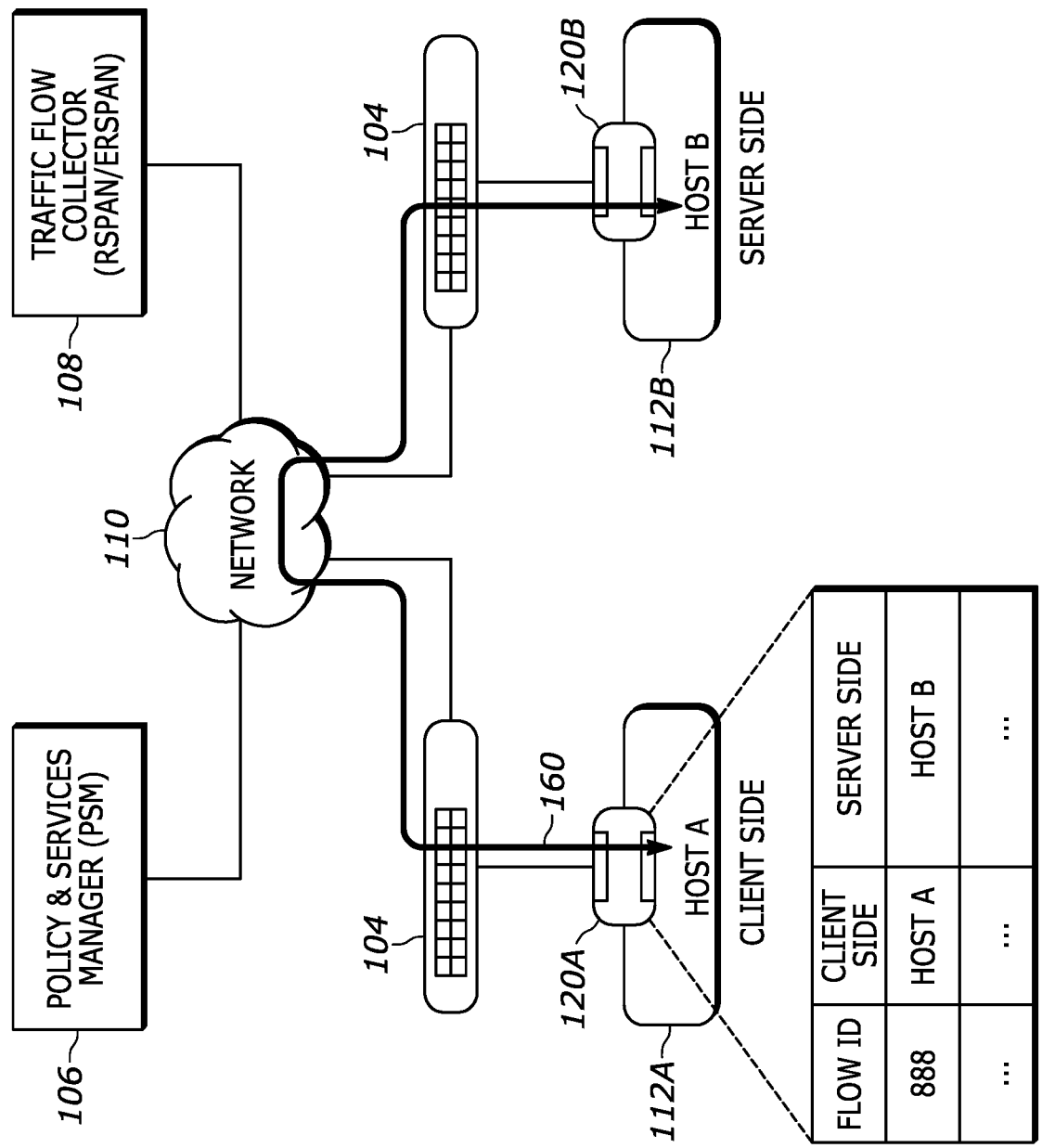
FIGS. 7A and 7B illustrate examples of how the interface on which packet traffic is received and transport layer header information can be used by an edge device to determine a side of a communication that corresponds to the packet traffic.
Figure 7B:
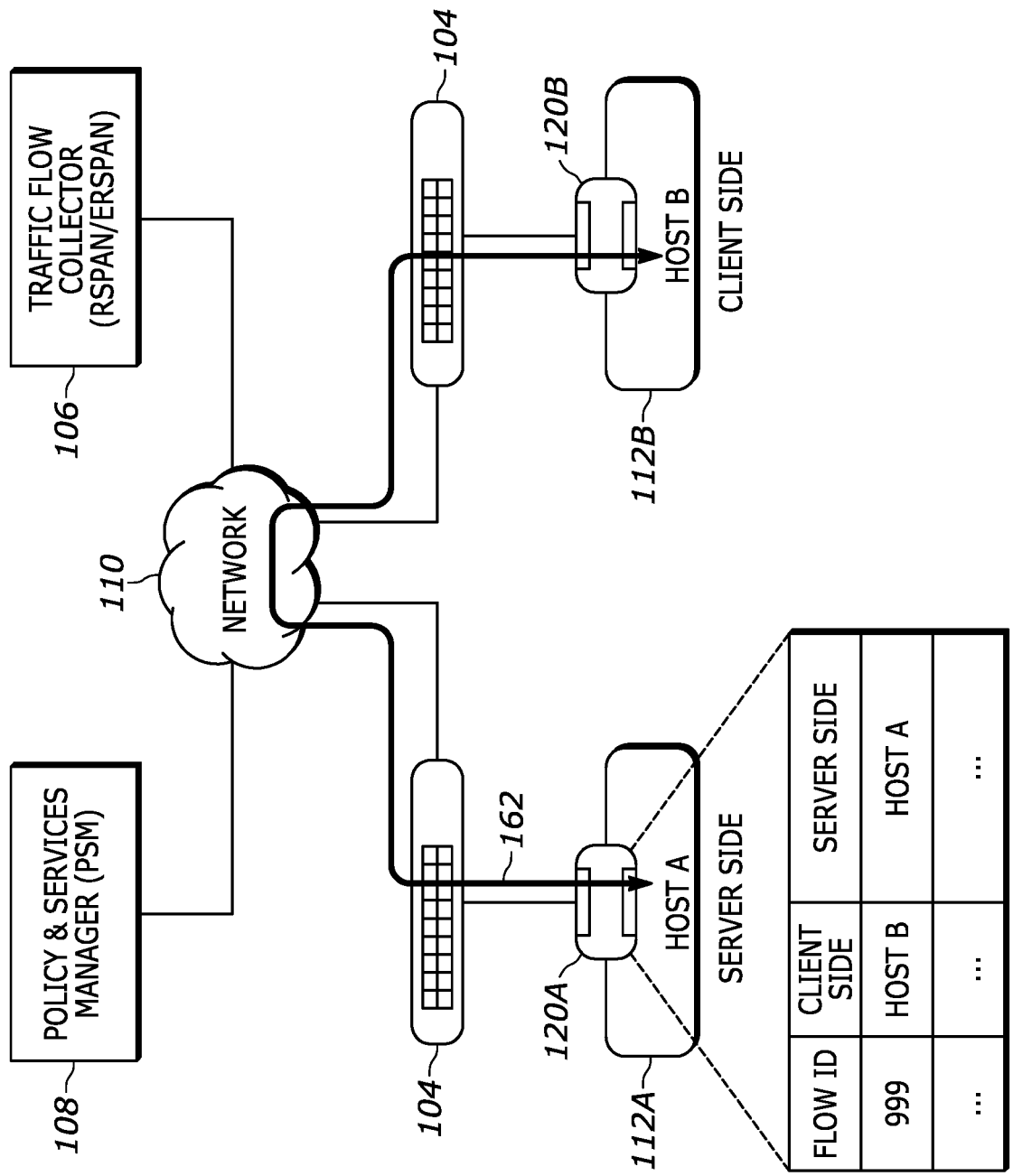

FIGS. 7A and 7B illustrate examples of how the interface on which packet traffic is received and transport layer header information can be used by an edge device to determine a side of a communication that corresponds to the packet traffic. With reference to FIG. 7A, host A 112A and host B 112B engage in client-server communications that include packet traffic 160. As is described below, receive and/or transmit interface information combined with inspection of header information of the packet traffic and knowledge of the client-server communications can be leveraged to determine a side of the network, e.g., a client-side or a server-side, which corresponds to the packet traffic. In the example of FIG. 7A, at the edge device 120A connected to host A, knowledge of the receive and/or transmit interface of the packet traffic combined with inspection of transport layer header information results in a determination that for the packet traffic (e.g., packet traffic with flowID=888) the client side corresponds to host A and the server side corresponds to host B.

The two hosts 112A and 112B may act as both a client and a server in communications between the same two hosts and because the side determination is a function of the client-server relationship between the two hosts during a specific communication (e.g., identified with a specific flowID), client/server side determinations can be specific to each communication. While FIG. 7A illustrates client-server communications in which the edge device 120A connected to host A 112A determines that host A is on the client side of the communication and that host B 112B is on the server side of the communication, FIG. 7B illustrates client-server communications between the same two hosts in which the edge device 120A connected to host A determines that for the packet traffic 162 (e.g., packet traffic with flowID=999), host B is on the client side of the network and that host A is on the server side of the network.

Figure 8A:
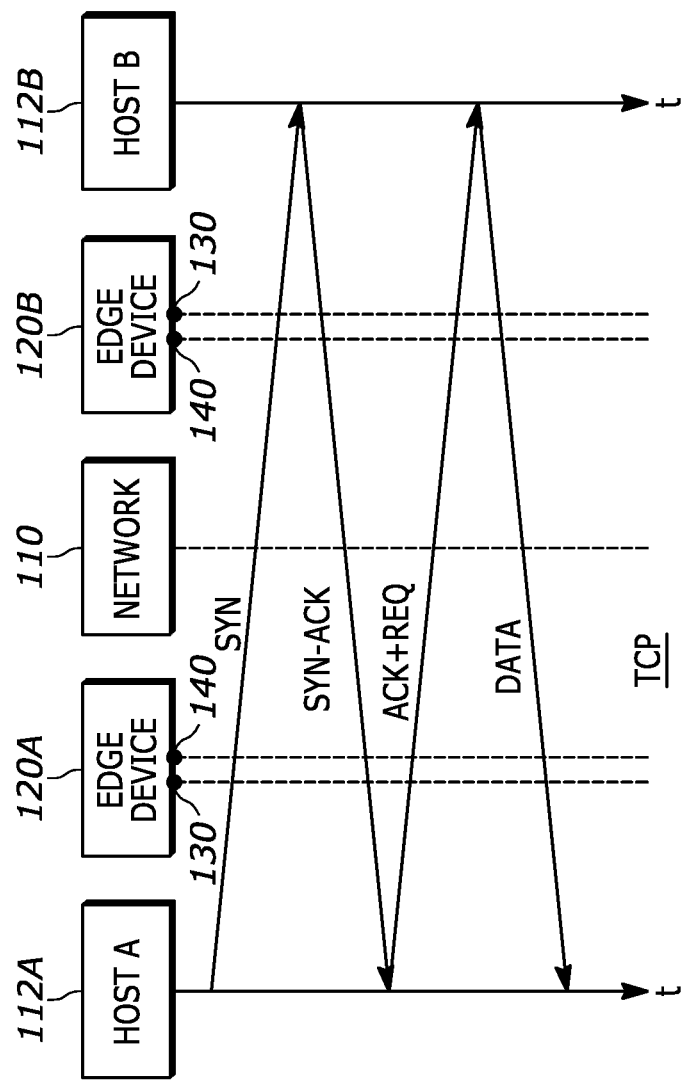
FIG. 8A illustrates TCP packet traffic between two hosts, as shown in FIGS. 7A and 7B that passes through the edge device connected to host A, through the network between host A and host B, and through the edge device connected to host B.
Figure 8B:
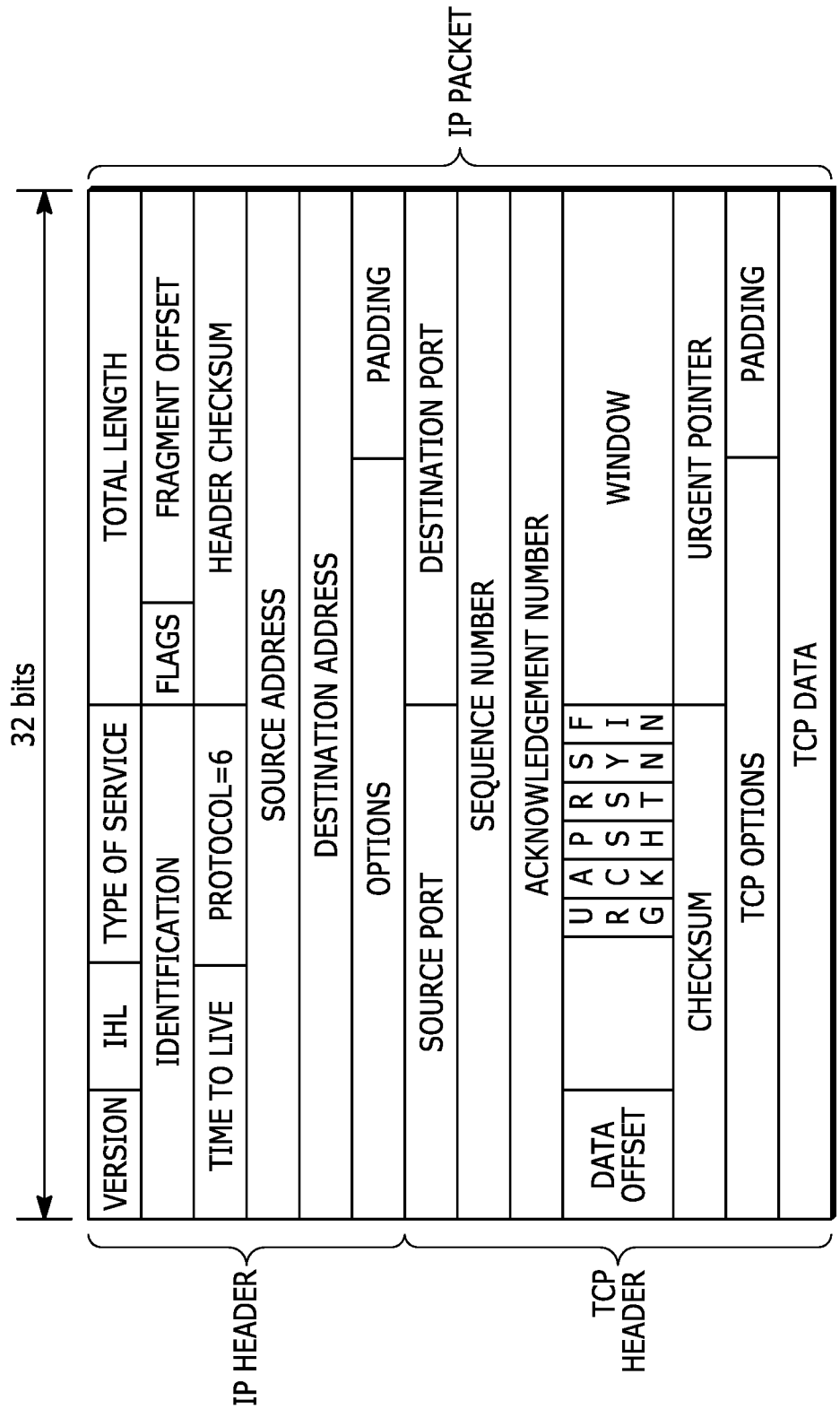
FIG. 8B depicts an example of a packet that includes a TCP/IP header.

In a case in which the hosts utilize TCP at the transport layer, the SYN and ACK header fields of a TCP header may be used in conjunction with receive and/or transmit interface information to determine whether a side that corresponds to packet traffic is a client side or a server side. FIG. 8A illustrates TCP packet traffic between two hosts, e.g., between host A 112A and host B 112B, as shown in FIGS. 7A and 7B that passes through the edge device 120A (e.g., a NIC) connected to host A, through the network 110 between host A and host B, and through the edge device 120B (e.g., a NIC) connected to host B. FIG. 8A also illustrates the packet traffic relative to the host interfaces 130 and the network interfaces 140 of the edge devices. As is known in the field, establishment of a TCP connection involves the client transmitting a SYN packet and the server returning and SYN-ACK packet. Leveraging this understanding of TCP, the edge devices can inspect the TCP headers of packet traffic to determine if a corresponding IP address of a host is on a client side of a communication or on a server-side of the communication. FIG. 8B depicts an example of a packet that includes a TCP/IP header. According to the TCP protocol, a SYN packet has the SYN field set and the ACK field not set and a SYN-ACK packet has the SYN field and the ACK field set. Knowing these features of TCP, side determinations can be autonomously made at the edge devices as follows:

At the edge device on the same side of the network as host A; SYN packet received at host interface and/or transmitted out the network interface=client side (see FIG. 8A); and SYN-ACK packet received at the network interface and/or sent out the host interface=client side (see FIG. 8A); or SYN packet received at the network interface and/or sent out the host interface=server side; and SYN-ACK packet received at the host interface and/or sent out the network interface=server side.

At the edge device on the same side of the network as host B:

SYN packet received at the network interface and/or sent out the host interface=server side (see FIG. 8A); and SYN-ACK packet received at the host interface and/or transmitted out the network interface=server side (see FIG. 8A); or SYN packet received at the host interface and/or transmitted out the network interface=client side; and SYN-ACK packet received at the network interface and/or sent out the host interface=client side.

As described above, a side determination can be made at an edge device by evaluating TCP header information at the edge device. Other header fields, including IP header and/or TCP header fields, may be used alone or in conjunction with the SYN and ACK fields to make a side determination.

Figure 9A:
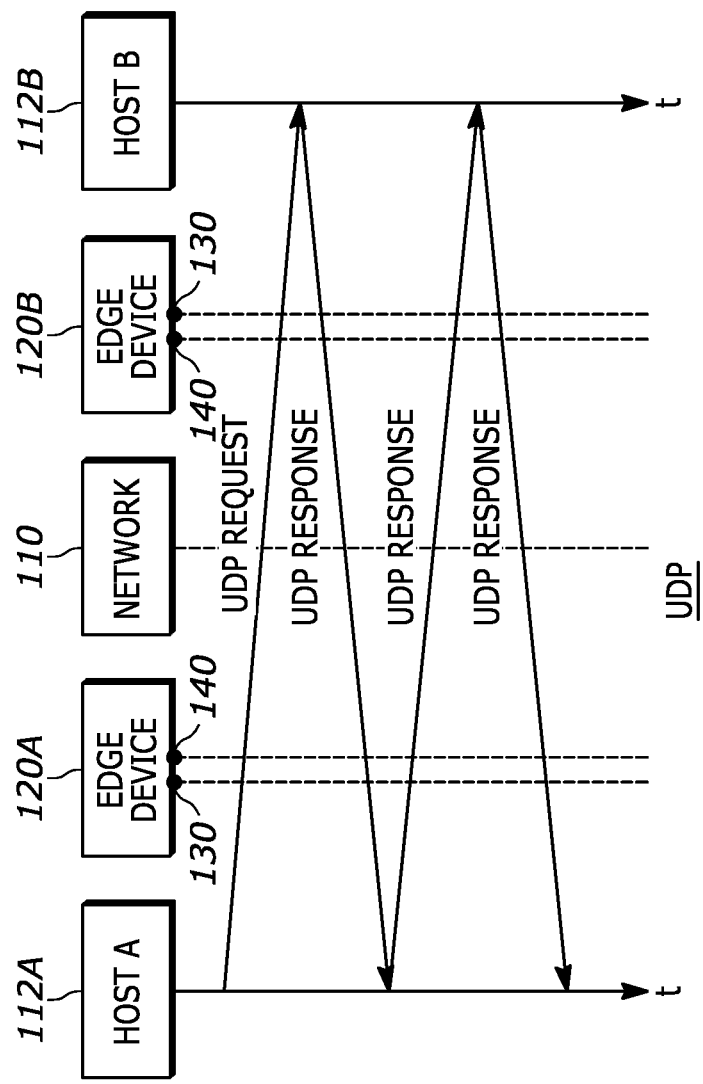
FIG. 9A illustrates UDP packet traffic between two hosts that passes through the edge device connected to host A, through the network between host A and host B, and through the edge device connected to host B.
Figure 9B:
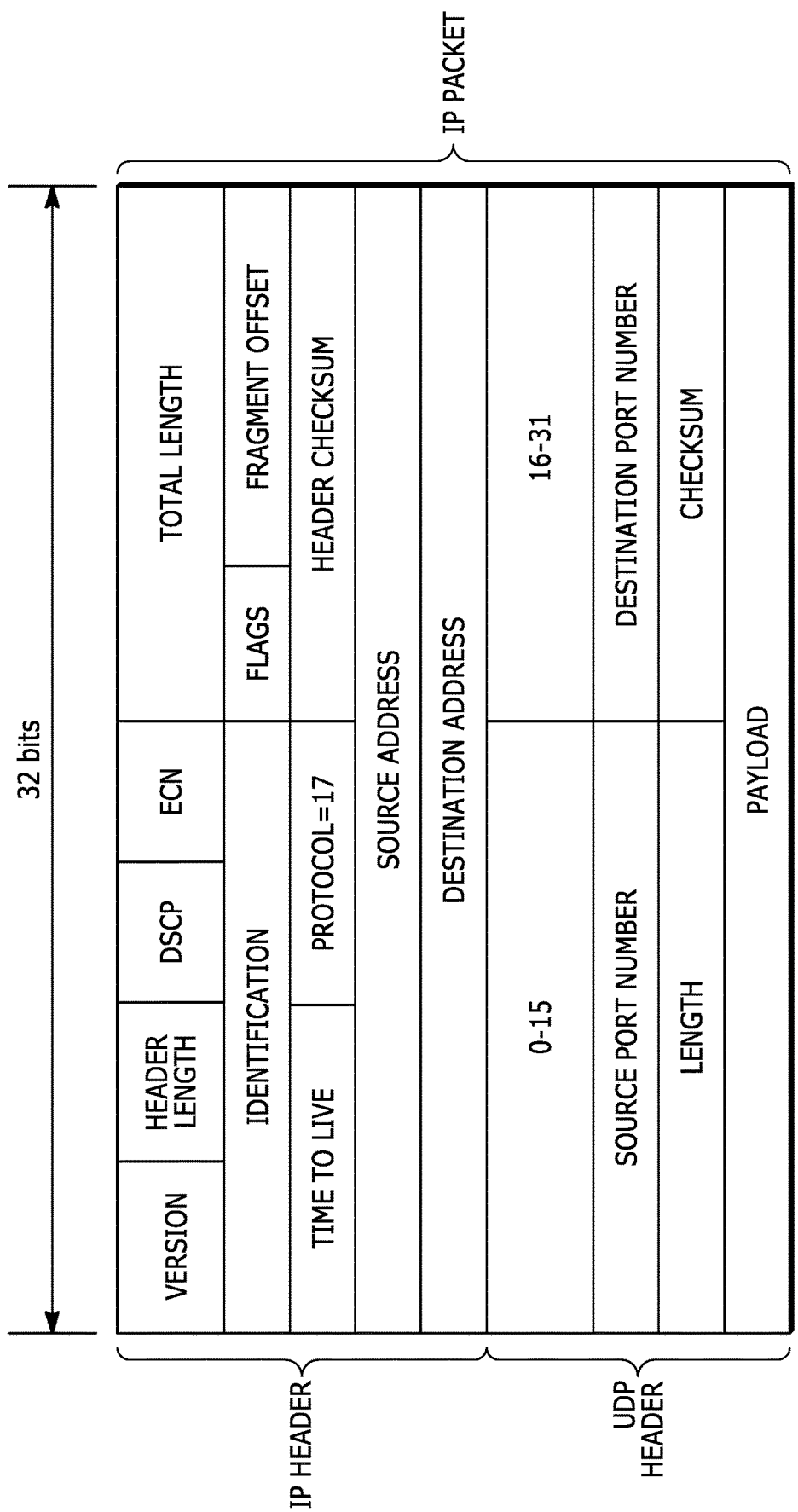
FIG. 9B depicts the frame format of a UDP/IP packet.

In a case in which the hosts utilize UDP at the transport layer, the source port number and/or the destination port number in a UDP header may be used in conjunction with receive and/or transmit interface information to determine whether a side that corresponds to the edge device regarding some particular packet traffic is the client side or the server side. As is known in the field, UDP communications involve a UDP request and UDP responses. FIG. 9A illustrates UDP packet traffic between two hosts, e.g., between host A 112A and host B 112B that passes through the edge device 120A (e.g., a NIC) connected to host A, through the network 110 between host A and host B, and through the edge device 120B (e.g., a NIC) connected to host B. FIG. 9A also illustrates the packet traffic relative to the host interfaces 130 and the network interfaces 140 of the edge devices. As is known in the field, UDP communications are considered "connectionless" and involve a UDP request from a first host (referred to as the client) followed by UDP responses from a second host (referred to as the server). FIG. 9B depicts the frame format of a UDP/IP packet.

In one example, an edge device can determine the side of the network with regard to particular packet traffic by the edge device inspecting the source and/or destination port number in the UDP header. For example, when a packet received at the host interface of the edge device includes a UDP header with a destination UDP port number of less than 1,024 and a source UDP port number of greater than or equal to 32,768, the edge device may determine that the edge device is on the client side of client-server communication at least because only the source UDP port number falls in a range that is recognized as an ephemeral port range, which indicates that the sender is the client in a client-server communication. In another example, an edge device may make a side determination based on information in the UDP header when a packet received at the host interface of the edge device includes a UDP header with a destination UDP port number that represents a well-known service, which indicates that the packet is being sent to a server in a client-server communication. Examples of well-known services that use UDP include port 53 (DNS), port 69 (Trivial File Transfer Protocol (TFTP), port 123 (Network Time Protocol (NTP)), and port 389 (Lightweight Directory Access Protocol (LDAP)). Thus, leveraging an understanding of UDP along with knowledge of the receive and/or transmit interface of the packet traffic, the edge devices can inspect the UDP headers of the packet traffic to determine if the edge device is on a client side of a communication or on a server side of the communication with regard to the particular packet traffic. In another example, the edge device can determine its side by inspecting information in the application protocol encapsulated in the UDP message. For example, the DNS protocol prescribes the use of the same port number (e.g., port number 53) by the client and by the server. However, by inspecting the DNS message it is possible to determine whether it represents a query or a response. Based on knowledge of the protocol, it is known that the query is coming from the client, while the response is coming from the server of the communication.

Figure 10A:
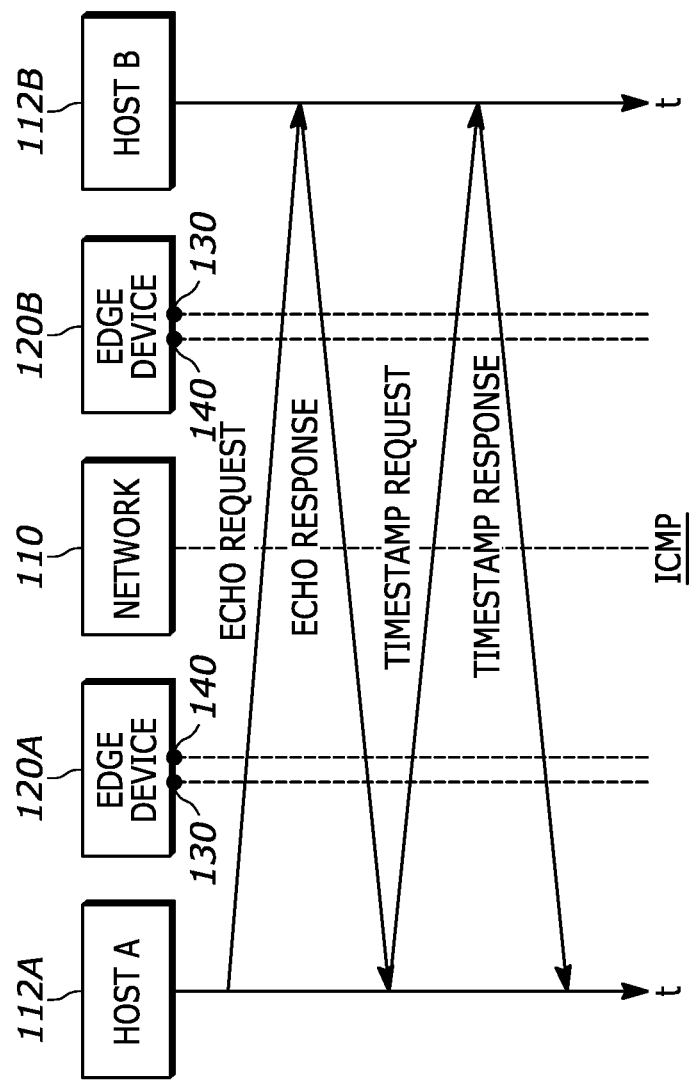
FIG. 10A illustrates ICMP packet traffic between two hosts that passes through the edge device connected to host A, through the network between host A and host B, and through the edge device connected to host B.
Figure 10B:
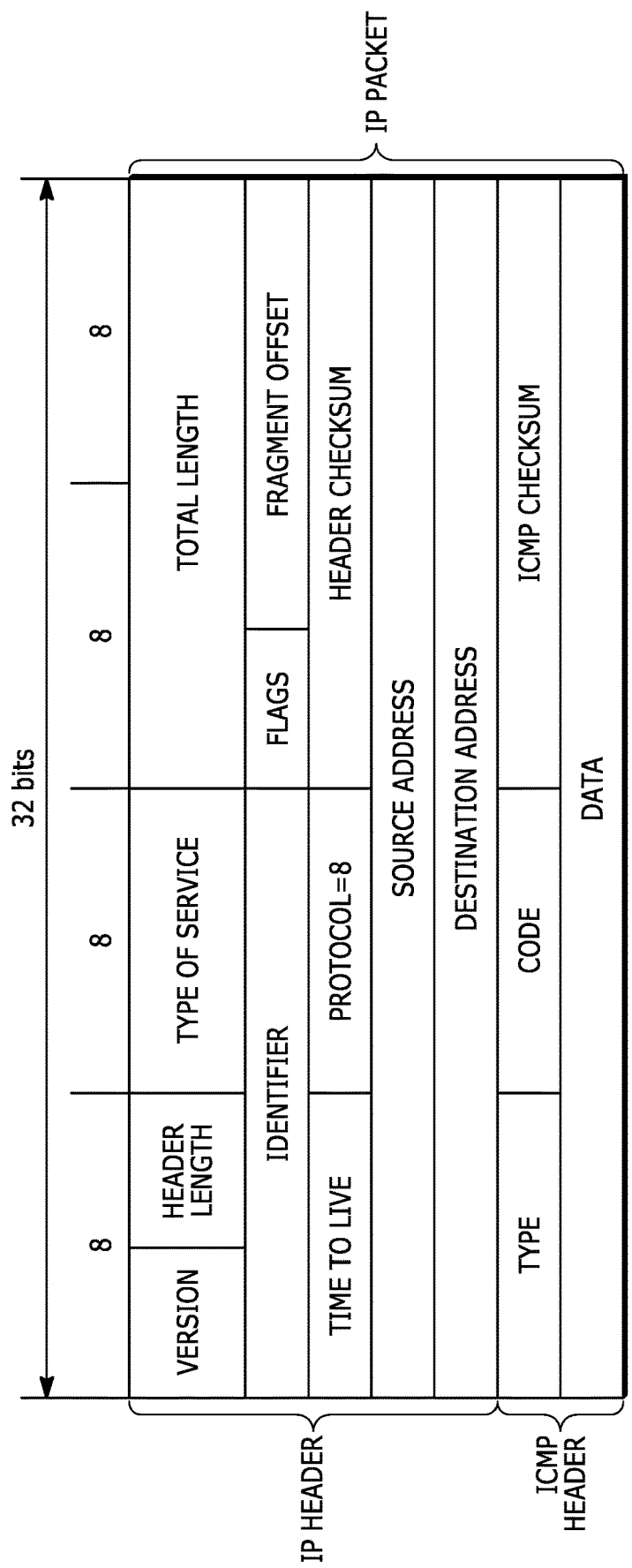
FIG. 10B depicts the frame format of an ICMP/IP packet.

In a case in which the hosts utilize Internet Control Message Protocol (ICMP) at the transport layer, ICMP header information may be used to determine whether a side that corresponds to the edge device regarding some particular packet traffic is the client side or the server side. As is known in the field, ICMP communications involve, for example, an Echo Request and Echo Response and/or a Timestamp Request and a Timestamp Response. FIG. 10A illustrates ICMP packet traffic between two hosts, e.g., between host A 112A and host B 112B that passes through the edge device 120A (e.g., a NIC) connected to host A, through the network 110 between host A and host B, and through the edge device 120B (e.g., a NIC) connected to host B. FIG. 10A also illustrates the packet traffic relative to the host interfaces 130 and the network interfaces 140 of the edge devices. FIG. 10B depicts the frame format of an ICMP/IP packet. As is known in the field the type of ICMP message is signaled in the "Type" field of the ICMP header.

Leveraging knowledge of the ICMP protocol, in one example, an edge device can determine the side of a communication with regard to particular packet traffic by the edge device inspecting the type field in an ICMP header. For example, from the perspective of the edge device connected to host A, when a packet received at the host interface of the edge device includes an ICMP header with the type field indicating that the packet is an Echo Request packet or a Timestamp Request packet, the edge device may determine that the edge device is on the client side of the client-server communication at least because an Echo Request packet is generated by a client and when a packet received at the network interface of the edge device includes an ICMP header with the type field indicating that the packet is an Echo Response packet or a Timestamp Response packet, the edge device may determine that the edge device is on the client side of the client-server communication at least because an Echo Response packet or a Timestamp Response packet is generated by a server. Likewise, from the perspective of the edge device connected to host B, when a packet received at the network interface of the edge device includes an ICMP header with the type field indicating that the packet is an Echo Request packet or a Timestamp Request packet, the edge device may determine that the edge device is on the server side of the client-server communication at least because Echo Request and Timestamp Request packets are generated by a client and when a packet received at the host interface of the edge device includes an ICMP header with the type field indicating that the packet is an Echo Response packet or a Timestamp Response packet, the edge device may determine that the edge device is on the server side of the client-server communication at least because Echo Response and Timestamp Response messages are generated by a server.

Although some examples of protocols that can be used in the side determination process are provided, other protocols, including higher layer protocols may be used in the side determination process. For example, determining a side of a communication that corresponds to edge device includes examining a field in an application layer (L7) header of the packet traffic. For example, there may be applications/protocols that use a paradigm different from the client/server paradigm, but where each of the communicating hosts plays a specific role in the communication based on the specific application and/or protocol that is being used. The edge device, with knowledge of the application/protocol and by monitoring the packet traffic, can autonomously determine the role of the host on its side of the communication. The side determination can then be used in the application of a task distribution rule.

In an embodiment, knowledge of the local IP addresses and remote IP addresses of host computing systems may be learned from traffic that is received at and/or transmitted from an edge device. For example, an edge device may classify IP addresses from the source IP address field of packets received on its host interface as local IP addresses and the same edge device may classify IP addresses from the source IP address field of packets received on its network interface as remote IP addresses. The classified IP addresses can be held at the edge device in an IP address table for use in implementing autonomous rule-based task coordination amongst edge devices as described herein. FIG. 11 depicts an example of a table 170 that may be stored at an edge device that includes both local IP addresses (e.g., IP addresses that are "behind" the edge device) and remote IP addresses (e.g., IP addresses that are "behind" edge devices on another side of the network). With such an IP address table stored at an edge device, in an embodiment, side determinations can be made by inspecting the source and/or destination IP addresses of the IP header of a packet, comparing the source and/or destination IP addresses to the table, and applying some side determination logic. For example, side determination logic implemented at an edge device with respect to a packet using the table of FIG. 11 may include logic such as:

```
if source IP address = local, then
    side = source;
if source IP address = remote, then
    side = destination;
if destination IP address = local, then
    side = destination;
if destination IP address = remote, then
    side = source.
```

That is, reading the first rule, if the source IP address of a packet at the edge device matches an IP address in the "local" column of the table in FIG. 11, then the edge device corresponds to the source side of the network with regard to that packet. Likewise, if the source IP address of the packet at the edge device matches an IP address in the "remote" column of the table in FIG. 11, then the edge device corresponds to the destination side of the network. Thus, in an embodiment, such a table can be used to make a side determination without regard to the interface of on which a packet was received and/or transmitted.

As described above, the application of a task distribution rule by an edge device involves using the side that has been determined to correspond to the edge device with regard to a communication to determine if a particular task related to the communication should be executed at the edge device. In one embodiment, the task distribution rule that is applied at each the edge device is a function solely of the side determination. For example, the task distribution rule is solely a function of whether the edge device corresponds to the source side of a communication or to the destination side of the communication with regard to some packet traffic or the task distribution rule is solely a function of whether the edge device corresponds to the client side of a communication or to the server side of the communication for the packet traffic. An example of two different task distribution rules that are a function solely of a source/destination side determination are as follows:

```
if side = source, then execute task; and
if side = destination, then do not execute task;
or
if side = destination, then execute task; and
if side = source, then do not execute task.
```

An example of two different task distribution rules that are a function solely of a client/server side determination are as follows:

```
if side = client, then execute task; and
if side = server, then do not execute task;
or
if side = server, then execute task; and
if side = client, then do not execute task.
```

Although the above identified task determination rules can effectively coordinate the distribution of tasks amongst edge devices to avoid duplication of a task amongst edge devices, more intelligent task distribution rules may be used to coordinate the execution of a task amongst edge devices in a manner that provides benefits beyond simply avoiding duplication of a task. A further description of various example task distribution rules, which are all still a function of the side determination are described below.

In some embodiments, task distribution rules can be a function of the determined side and some additional piece of information related to the packet traffic to implement more intelligent, or advanced, task distribution logic. For example, task distribution rules can also be a function of header data such that the execution of tasks related to multiple different flows of packet traffic is distributed amongst the NICs in a manner that achieves some additional goal.

A discussion of various different task distribution rules, including possible benefits and/or drawbacks are now described. The example task distribution rules include rules solely based on a side determination and rules based on a side determination and some other information.

1.a) The edge device on the source (or destination) side always processes the packet traffic. This solution may be preferable for many applications because even if a packet is lost after transmission, the task will most likely have already been executed at the edge device on the source side of the communication. For example, in case of packet capture applications, it is desirable that each packet is captured, even if the packet does not reach the destination. In other applications where only packets that reach the destination should be processed, only the edge device at the destination shall process the packet. This solution can have two drawbacks:

it is not applicable to applications based on state information extracted from packets in both directions of a flow (e.g., in which case all packets of a flow should be processed by the same edge device, whether at their source or destination); and the edge device of a host that generates a large amount of traffic has a much higher load than a host that generates less traffic.

1.b) An edge device XORs the least significant bit (or the N least significant bits) of the source and destination IP addresses of a packet. If the result is 0 (or 1), the source side edge device executes the task, otherwise, the destination side edge device executes the task. This task distribution rule can address the problem of distributing traffic between the source and destination side of a network for hosts that originate a large amount of traffic. Other task distribution rules, which aim to distribute traffic between the source and destination side of the communication may involve:

XORing bits of other fields in the packet;
comparing the source IP address and the destination IP address of the packet and: if the source IP address is smaller than the destination IP address, the source (or destination) side edge device executes the task; otherwise the destination (or source) side edge device executes the task;
if a comparison on 32 bits is too costly (or if IPv6 is being used, which would require a 128 bit comparison), a subset of the addresses, possibly hashed, is may be used in a comparison. Using a subset of the address can lead to cases where the two items being compared are equal. In that case the packet may be processed twice, but the probability of this happening is quite low;
if an IP header for packet traffic is not present, other information uniquely identifying the two endpoints of the communication or the direction of the communication can be used. For example, in a Data Link Layer (Layer 2) communication (such as an ARP transaction), the source and destination MAC addresses can be used;
if multiple IP headers are used in the packet (e.g., because of tunneling and an overlay network are being deployed), edge devices can use information in one or both of the headers to apply the task distribution rule according to the approaches presented here; and
using hashing techniques on protocol fields with distribution of hashes in two buckets, one for the source side, one for the destination side.

The approach of applying a task distribution rule to balance the task execution load between the edge devices on the source and destination sides of the communication may be undesirable in data centers where workloads are already placed on hosts with the goal of balancing the amount of traffic they generate.

1.c) The edge device on the client (or server) side of a communication executes the task related to the packet traffic. This task distribution rule may be suitable for tasks that are dependent on state information extracted from packets traversing the network in both directions (e.g., east-to-west and west-to-east). Since this approach is stateful, it is particularly applicable if connection tracking or other sort of flow table is already being implemented in the edge device, whereby the client and server sides are identified and their identity is stored among the information kept of both directions for each flow. If hosts have a single role (e.g., server) and generate a significantly larger amount of traffic than the dual role (e.g., client), this type of task distribution rule can lead to an unbalanced distribution of the task execution between the two edge devices on different sides of the communication.

1.d) Edge devices use a computation on some of the fields of a packet (see option 1.b) to determine whether the client or server side edge device should execute the task related to the packet. This task distribution rule can balance the task execution load between the server and client side edge devices and may be advantageous for scenarios where it is not known in advance whether the client (or server) side generates the most traffic and some edge devices should not be overloaded compared to others. Compared to task distribution rule 1.b, task distribution rule 1.d may be applicable to tasks that require processing both directions of traffic flows.

1.e) An edge device compares the source and destination IP address; if the edge device is on the side of the lowest (or highest) IP address, the edge device executes the task related to the packet. Such a task distribution rule can provide the advantage of having packets of both directions of a flow processed by the same edge device, while being stateless (e.g., because there is no need to determine client/server side). In such cases, all considerations related to comparing two addresses, including those related to complexity and availability of multiple IP headers (or none) in the packet (see task distribution rule 2.b) are applicable.

1.f) An edge device maintains a flow table and when the edge device sees a packet of a new flow, the edge device applies either rule 1.a or rule 1.b to determine whether it should execute the task related to the packet and records this decision for both directions of the flow. The edge device determines whether to process subsequent packets belonging to the bidirectional flow based on the information recorded in the flow table. With regard to such a task distribution rule, the following criteria may be considered: 1) the rule may be preferable for scenarios where the same edge device should execute the task related to packets in both directions of a flow, but the client/server side cannot be determined; 2) the implementation complexity of this task distribution rule may be higher than other rules at least because a flow table must be maintained; on the other hand, in a scenario where a flow table would be maintained and used anyway for traffic forwarding, such a task distribution rule may be advantageous at least because any processing related to processing delegation (e.g., side determination and task distribution rule application) must be done only on the first packet, hence reducing the overall processing load; one drawback of such as rule is that if the first packet of a flow does not reach one of the edge devices (e.g., the one on the server/destination side of the connection), the determination of the two edge devices will not be coherent as one edge device will have based its decision on the first packet, while the other edge device will have based its decision on the second packet. As a result, the task may be executed on packets of the flow by two edge devices or not at all. With regard to tasks where the former is more desirable (e.g., both edge devices execute the task) than the latter, source side edge device task execution should be used.

1.g) An edge device maintains a flow table and when the edge device sees a packet of a new flow the edge device applies either rule 1.c or 1.d to determine whether it should execute the task related to the packet and records this decision for both directions of the flow. The edge device determines whether to process subsequent packets belonging to the bidirectional flow based on the information recorded in the flow table. If the client/server side can be determined in a simple, reliable, and packet loss tolerant way (e.g., when TCP is being used, whereby both ends of the connection must receive TCP SYN and SYN-ACK messages for the connection to be established), this rule may be preferable to rule 1.g at least because the rule does not suffer from the issues stemming from the loss of the first packet of a flow. On the other hand, this rule may be superior to rules 1.c and 1.d at least because an edge device does not need to evaluate for each packet whether to execute the task: the edge device just needs to consult the flow table.

1.h) In case signaling (e.g., see FIG. 14) is being used to determine whether a flow traverses two edge devices (rule 1.b), the signal itself can be used to decide which edge device executes the task related to the packet traffic. The rule can be stateful, but does not require the processing of individual packets. The granularity of task distribution is a flow or a source-destination pair, or a given IP address (as source and destination). Two options for implementing such a task distribution rule may include: The edge device inserting/embedding (or receiving/extracting) the signal always executes the task related to the packet traffic. In this case, different edge devices execute the task related to packet traffic belonging to different directions of a flow, which is not suitable for applications that require information from both traffic directions for their implementations; The edge device on a selected side inserting/embedding (or receiving/extracting) the signal and having received (inserted) the signal for the reverse direction, executes the task related to packet traffic in both directions of the communication. Such a task distribution rule may be suitable for tasks that require an edge device to process packets of both directions of a communication. The selected side can be determined using one of the previous rules 1.a to 1.e; The signal includes an indication of the side that should execute the task related to the packet traffic of the flow. Possibly, such indication can be randomly generated to balance the load of task execution between the two sides.

Figure 12:
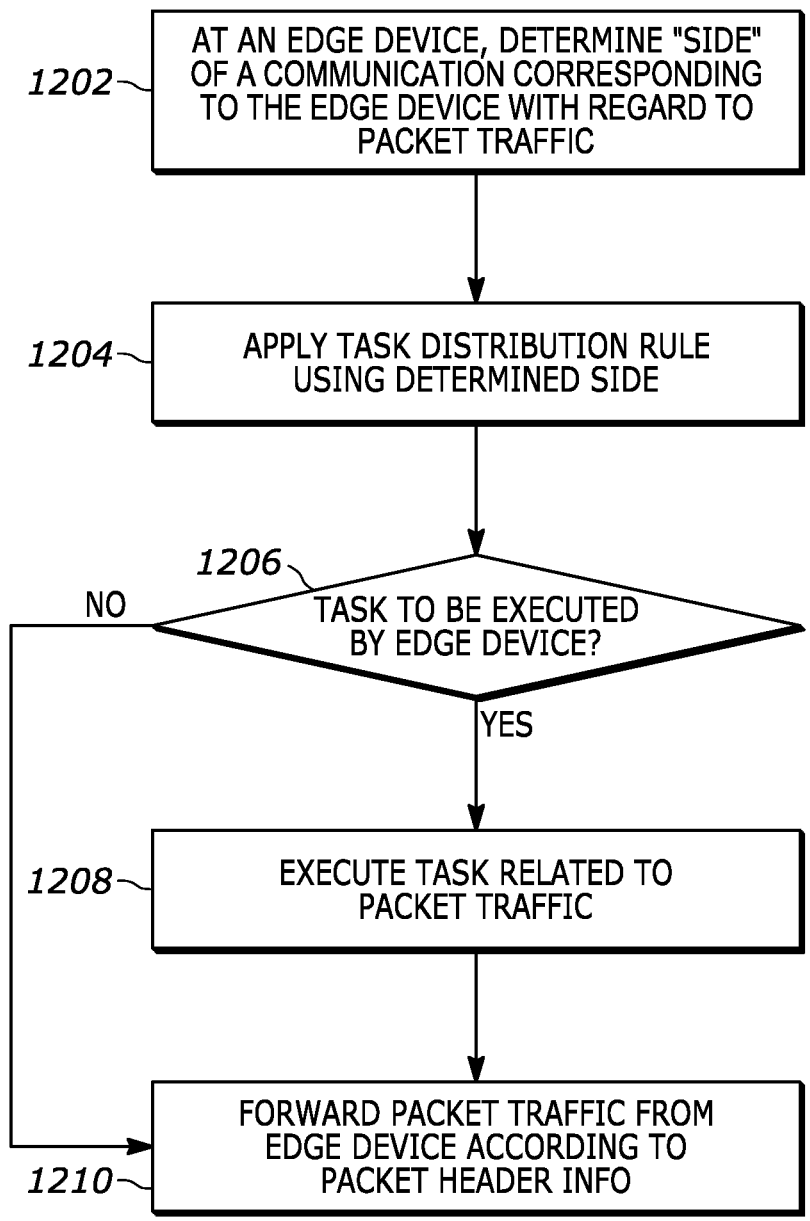
FIG. 12 is a process flow diagram of operations performed at an edge device to implement autonomous rule-based task distribution amongst multiple amongst edge devices.

Regardless of whether the side is determined to be source/destination or client/server, and regardless of the specific task distribution rule that is applied by the edge devices, the process of autonomous rule-based task distribution amongst edge devices is the same. FIG. 12 is a process flow diagram of operations performed at an edge device to implement autonomous rule-based task distribution amongst multiple amongst edge devices. At block 1202, at an edge device, a "side" of a communication corresponding to the edge device is determined with regard to packet traffic. At block 1204, a task distribution rule is applied using the determined side. At decision block 1206, it is determined if a task is to be executed by the edge device. If yes, at block 1208, the task related to the packet traffic is executed and the process proceeds to block 1210. If no, the process proceeds directly to block 1210. At block 1210, packet traffic is forwarded from the edge device according to packet header information.

Although the process flow diagram refers to a single task distribution rule, it should be understood that multiple different task distribution rules may be deployed throughout a network. For example, task distribution rules may be applied to packet traffic based on criteria such as per flow (e.g., per unique 5-tuple), per traffic type, per transport layer protocol, per application, generically based on the value of a specific header field, etc.

In the examples described above, it is assumed that there are edge devices on both sides of the network that are configured to implement autonomous rule-based task distribution using the same task distribution rule. However, in some cases it cannot be assumed that there are edge devices on both sides of the network that are configured to implement autonomous rule-based task distribution using the same task distribution rule as described herein. Thus, in some cases, an edge device discovery process is implemented to learn whether a particular packet or flow of packet traffic traverses two such edge devices as the packet or flow of packet traffic travels across the network from one host to another host. Various different edge device discovery processes are possible and some examples are described herein.

In one example, the edge devices learn the IP address, or IP addresses, that are used by the local host (e.g., the host that is on the same side of the network), for example, as previously described with reference to FIG. 11, and then the edge devices send the learned information to a centralized location for management and distribution. An example of a centralized edge device discovery process is described with reference to FIGS. 13A-13C.

Figure 13A:
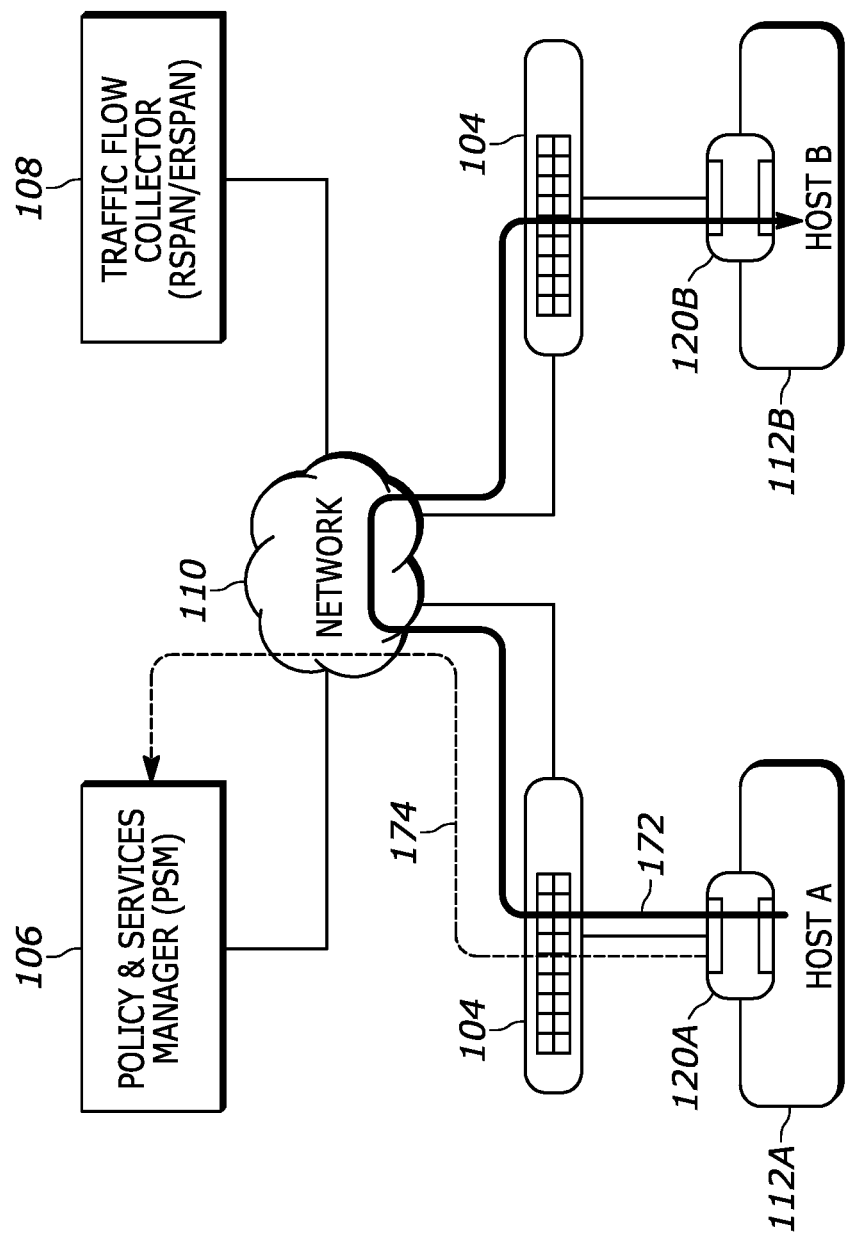
FIGS. 13A-13C illustrate an example of a centralized edge device discovery process.

FIG. 13A depicts a network architecture similar to that described above in which packet traffic is transmitted across the network from host A 112A to host B 112B. The packet traffic transmitted from host A to host B is represented by arrow 172. As part of the edge device discovery process, the edge device 120A connected to host A identifies the IP address of host A by inspecting the source IP address field of the IP header of the packet traffic that is received at the host interface of the edge device (as described above) as the packet traffic traverses through the edge device from the host interface to the network interface. The edge device then sends the IP address of host A to the PSM 106 as indicated by the dashed-line arrow 174. Via this communication, the PSM knows that the received IP address corresponds to a host that is on the same side of the network as the edge device. For example, the PSM knows that a host having the received IP address is "behind" an edge device that is configured to implement autonomous rule-based task distribution amongst edge devices. That is, the host with the corresponding IP address is behind the edge device in that the edge device is in path between the host and the network such that packet traffic generated at the host device traverses the edge device to reach the network and such that packet traffic received at the host device from the network traverses the edge device before reaching the host.

Figure 13B:
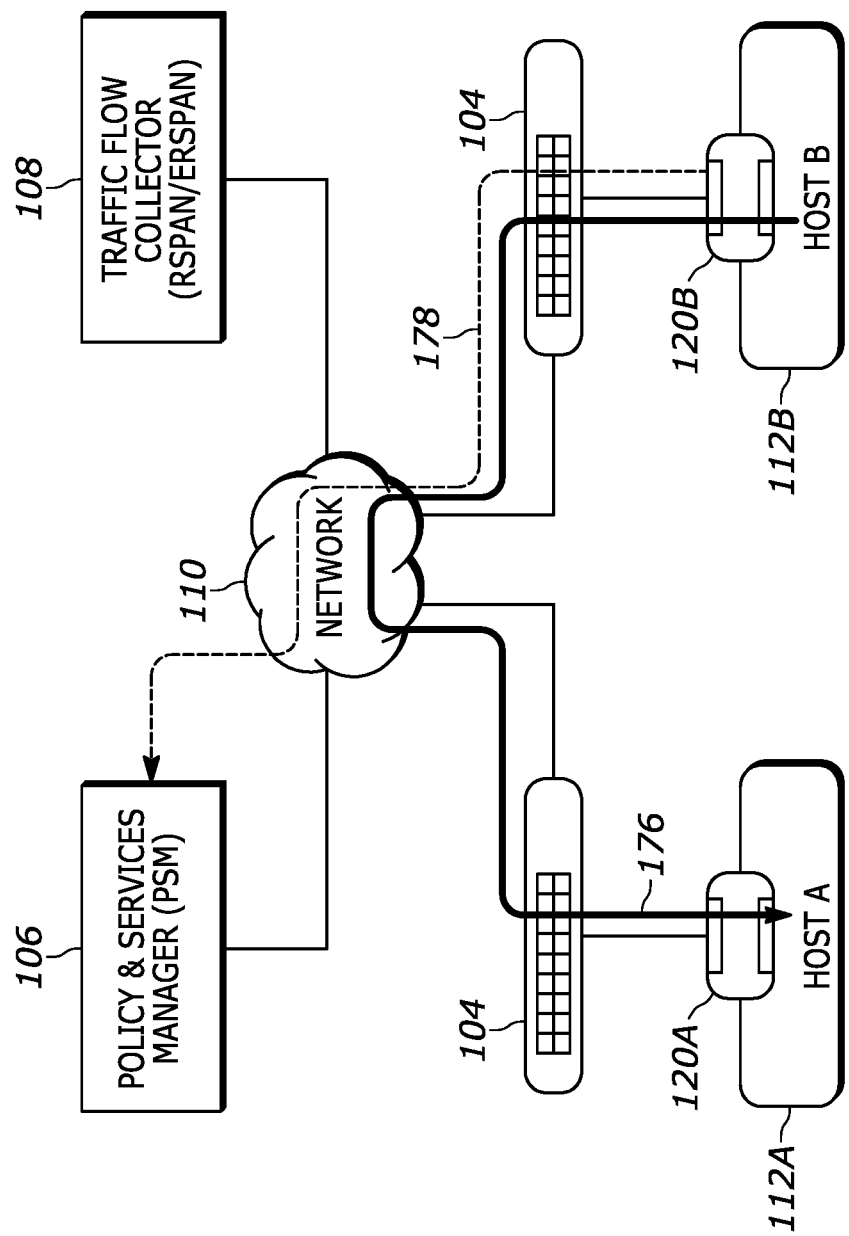

A similar process is implemented by the edge device on the other side of the network. FIG. 13B depicts a network architecture similar to that described above with regard to FIG. 13A in which packet traffic is transmitted across the network from host B 112B to host A 112A. The packet traffic transmitted from host B to host A is represented by arrow 176. As part of the edge discovery process, the edge device 120B connected to host B identifies the IP address of host B by inspecting the source IP address field of the IP header of the packet traffic that is received at the host interface of the edge device (as described above) as the packet traffic traverses through the edge device from the host interface to the network interface. The edge device then sends the IP address of host B to the PSM 106 as indicated by the dashed-line arrow 178. Via this communication, the PSM knows that the received IP address is on the same side of the network as the edge device. For example, the PSM knows that a host using the received IP is "behind" an edge device that is configured to implement autonomous rule-based task distribution amongst edge devices.

Figure 13C:
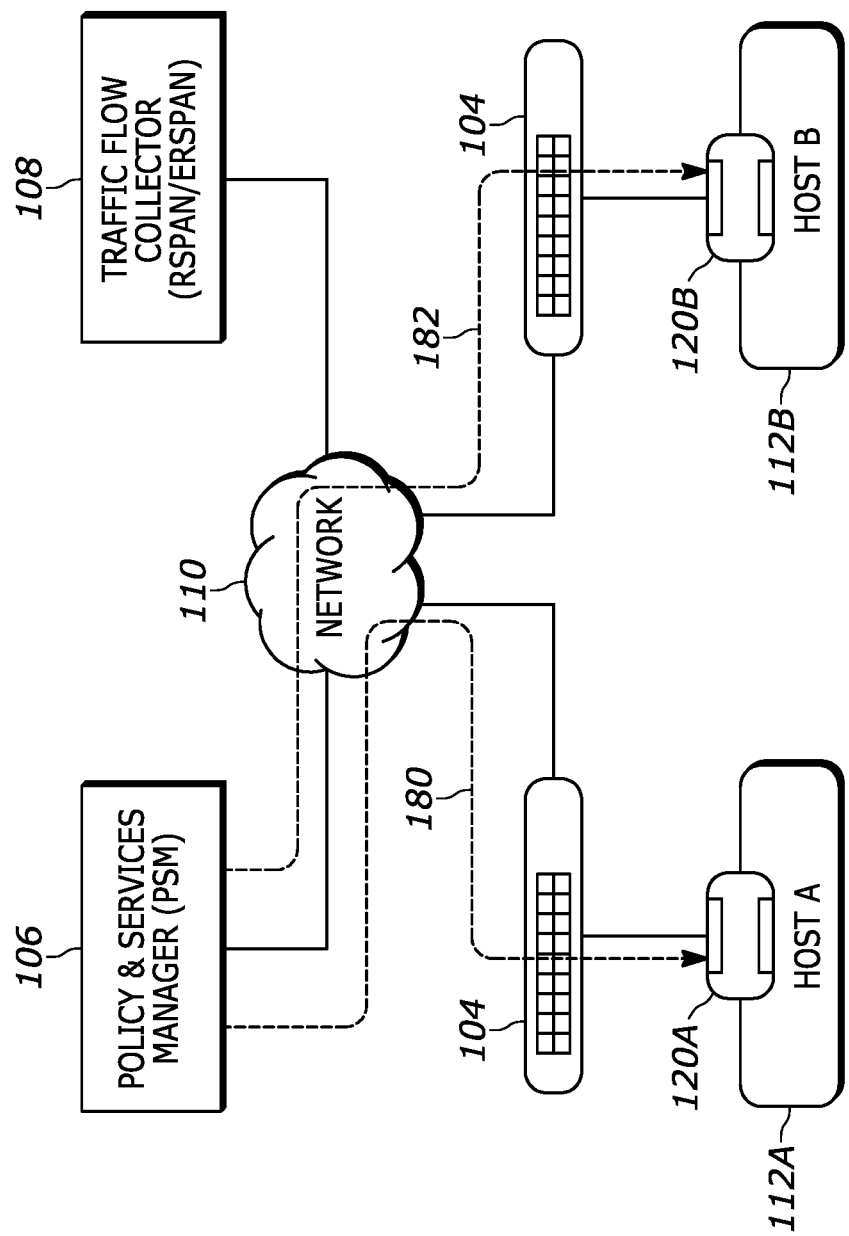

As illustrated with reference to FIGS. 13A and 13B, the PSM 106 receives information from both edge devices 120A and 120B regarding the IP addresses that are located behind edge devices that are configured to implement autonomous rule-based task distribution amongst edge devices. Although only two edge devices/hosts are shown and described with reference to FIGS. 13A and 13B, it should be understood that this process of IP address discovery notification could be replicated amongst many edge devices in a network such as a hyperscale cloud network. As part of the edge device discover process, the PSM can then combine, organize, and distribute the IP addresses to edge devices in the network. In an embodiment, the PSM 106 creates an aggregated list of all of the IP addresses and/or IP address prefixes that are "behind" edge devices and distributes the list (or updates to the list) to the edge devices. FIG. 13C illustrates the distribution of information regarding the IP addresses of hosts that are located behind edge devices that are configured to implement autonomous rule-based task distribution amongst edge device. In particular, the dashed-line arrows 180 and 182 represent the edge device discovery information (e.g., host IP addresses) being distributed to the edge devices. With such knowledge of the host IP addresses distributed to the edge devices, the edge devices can use the host IP address information to determine whether or not to apply a task distribution rule to particular packet traffic and/or to make side determinations.

Figure 14:
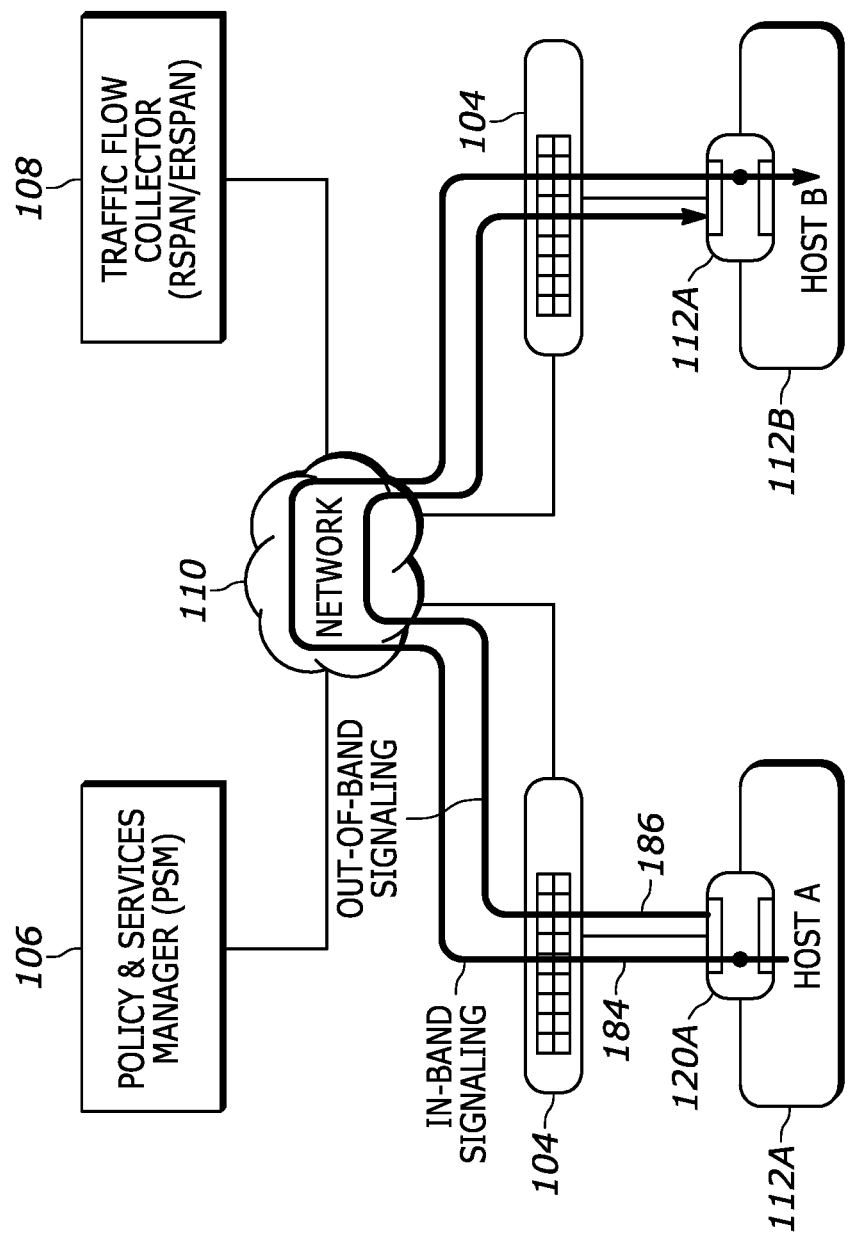
FIG. 14 illustrates both in-band signaling between edge devices and out-of-band signaling between edge devices.

In another example, the edge device discovery process involves device-to-device signaling to communicate information regarding the IP address, or IP addresses, that are used by hosts that are behind similarly configured edge devices, e.g., edge devices that are configured to implement autonomous rule-based task distribution amongst edge device. For example, the signaling between edge devices may be "in-band" signaling or the signaling between edge devices may be "out-of-band" signaling. FIG. 14 illustrates both in-band signaling 184 between edge devices and out-of-band signaling 186 between edge devices 120A and 120B, both of which are described below.

In the case of in-band signaling 184, the edge devices 120A and 120B are configured to embed information into the packet traffic generated by the hosts and to recognize such embedded information to signal information about IP addresses that are behind similarly configured edge devices. Some examples of how edge device discovery information may be embedded into the packet traffic generated by the host include:

1) overloading unused fields in packet headers, e.g., by setting the URG bit in TCP SYN and SYN-ACK packets, this may not work properly if the application is setting the URG bit;
2) including a signal in the payload of SYN and SYN-ACK TCP packets, this works only for TCP;
3) including a signal in the payload of a TCP or UDP packet the same way an Inband Network Telemetry (INT) header is added to a TCP or UDP packet (e.g., see Section 5.6.2 of INT Specification v2.1 of the P4 Language Consortium); and
4) including a signal in an HTTP or other application headers, this may be useful when an L7 load balancer terminates a session between a client and a server.

Edge devices that are configured to implement autonomous rule-based task distribution amongst edge device may also be configured to recognize such in-band signaling. Once such in-band signaling is recognized in packet traffic, the edge device can learn the corresponding source IP address and add the IP address to a list of IP addresses that are behind similarly configured edge devices. The IP address list can be used to determine if the edge device should apply a task distribution rule to particular packet traffic and/or to make a side determination as described herein.

In the case of out-of-band signaling 186, the edge devices 120A and 120B are configured to generate notification messages in the form of packets that are specifically generated to communicate edge device discovery information. For example, the edge device connected to host A 112A may generate and send a packet addressed to host B 112B that carries edge discovery information, such as the IP address, or IP addresses, of the host that is behind the edge device, in its payload. The packet is received at the edge device connected host B and some signal embedded in the packet (e.g., such as the signals described above) triggers the edge device connected to host B to read the IP address information in the packet (e.g., the source IP address in the IP header or one or more IP addresses in the payload) to learn the IP address, or addresses, of the host that is behind the edge device. The edge device connected to host B may react by sending a similar packet to host A to notify the edge device connected to node A of the IP addresses used by host B. In another possible implementation, an edge device sending an out-of-band signal may include a list of all IP addresses behind edge devices other than itself previously learned by received out-of-band and/or in-band signals. In an embodiment, a combination of out-of-band signals and in-band signals may be used.

In another approach to edge device discovery, an administrator may distribute IP address information to the edge devices related to the hosts (and/or workloads) that are behind edge devices and/or the edge device itself through, for example, a management interface. In an embodiment, the IP address information may be in the form of a specific IP address or addresses, or in the form of information that summarizes a set of IP addresses, such as an IP prefix (e.g., including, for example, of an address and a netmask or an address and a prefix length).

In another embodiment, edge discovery may involve a hybrid approach that utilizes both a centralized approach and a device-to-device approach. For example, an edge discovery implementation may involve an initial centralized device discovery process followed by a signaling operation that involves device-to-device updates. An embodiment in which an administrator configures IP addresses can provide some advantages, including that a manual configuration can be very concise because the administrator can, for example, provide a single IP address prefix that is being used in a data center (or in the portion of the data center that deploys edge devices configured for autonomous rule-based task coordination) and that is all edge devices need to definitively know which destination IP addresses are behind another so-configured edge device.

Figure 15:
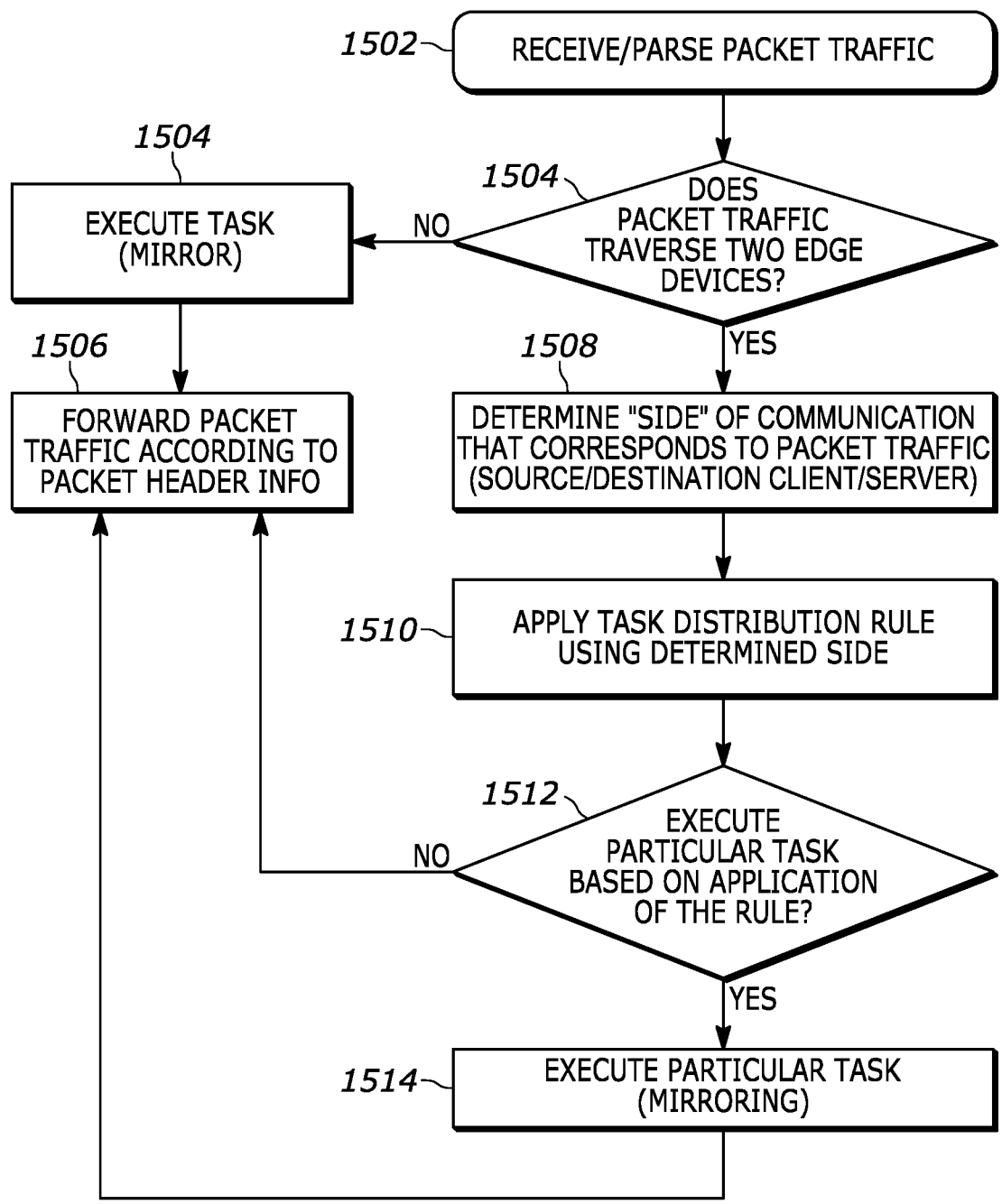
FIG. 15 is a process flow diagram when cannot be assumed both edge devices apply same task distribution rules.

FIG. 15 is a process flow diagram when can't be assumed both edge devices apply same task distribution rules. At block 1502, a packet is received and parsed. At decision block 1504, it is determined if the packet traffic traversed to edge devices. If no, the processed proceeds to block 1504 and a task (e.g., port mirroring) is executed and the process proceeds to block 1506, at which point the packet is forwarded according to its packet header information. If yes at decision point 1504, then at block 1508, a "side" of the communication that corresponds to packet traffic is determined. For example, the side may be determined as either source or destination side or the side may be determined as either client or server side. Next, at block 1510, a task distribution rule is applied using the determined rule. At decision block 1512, it is determined if a particular task is executed based on application of the rule. If no, the process proceeds to block 1506. If yes, at block 1514, the particular task (e.g., port mirroring) is executed and the process proceeds to block 1506.

In an embodiment, packet traffic related to a communication may involve one packet or a flow of packets (e.g., packets with the same 5-tuple). Thus, packet traffic as used herein may be a single packet, or a "flow" of packets, e.g., a flow of packets with the same 5-tuple, a flow of packets from the same TCP session.

The autonomous rule-based task distribution is described above in a case in which the task is related to, for example, port mirroring. However, the tasks that are implemented according to the autonomous rule-based task distribution can be any task related to the communication. Other tasks include, for example, implementing access control policies/lists, collecting flow based data, telemetry, etc., although this is in no way an exhaustive list.

In an embodiment, the autonomous rule-based task distribution technique described herein is applicable to communications between any two host computing systems equipped with edge devices as described herein. In an embodiment, an edge device includes a piece of hardware that controls the flow of packet traffic at a boundary between two computing domains (e.g., between a host/server domain and a network domain or server domain/network domain). That is, the job of the edge device is to control flow of packet traffic, not to perform a desired higher level function/application. In an embodiment, the edge device may be implemented as a virtual device on a host computing system. For example, the edge device may be implemented in software running a computing system such as network switch. In another embodiment, the edge device may be implemented in logic within an IC device of a switch (e.g., as an intellectual property (IP) block or logic module).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for processing packet traffic, the method comprising:

applying, in an integrated circuit device, a task distribution rule to the packet traffic in response to identifying a side of a communication between a local host computer and a remote host computer based on packet traffic of the communication that is processed in the integrated circuit device to determine if a particular task related to the packet traffic should be executed at the integrated circuit device, wherein the task distribution rule is configured to ensure that the particular task is executed at only one side of the communication between the local and remote hosts, wherein a side of the communication between the local host computer and the remote host computer is identified based on packet traffic of the communication that is processed in the integrated circuit device, wherein the side of the communication between the local and remote host computers is based on at least one of 1) whether the integrated circuit device is on a source side of the communication or on a destination side of the communication, and 2) whether the integrated circuit device is on a client side of the communication or on a server side of the communication;

wherein:

the integrated circuit device includes a host interface that includes a PCIe interface and a network interface that includes an Ethernet interface, wherein the local host computer is connected behind the integrated circuit device via the PCIe interface such that packet traffic generated at the local host computer and received at the PCIe interface of the integrated circuit device traverses through the integrated circuit device to reach the Ethernet interface and such that packet traffic received at the Ethernet interface of the integrated circuit device traverses through the integrated circuit device to reach the local host computer via the PCIe interface;

the integrated circuit device corresponds to the source side of the communication for packet traffic received at the integrated circuit device on the PCIe interface of the integrated circuit device; and the integrated circuit device corresponds to the destination side of the communication for packet traffic received at the integrated circuit device on the Ethernet interface of the integrated circuit device.

2. The method of claim 1, wherein identifying a side of a communication that corresponds to the integrated circuit device includes examining a field in a header of the packet traffic.

3. The method of claim 2, wherein identifying a side of the communication that corresponds to the integrated circuit device is a function of an interface corresponding to the packet traffic and a state of the field in the header.

4. The method of claim 1, wherein identifying a side of a communication that corresponds to the integrated circuit device includes examining the Synchronize (SYN) and Acknowledge (ACK) fields in a Transmission Control Protocol (TCP) header of the packet traffic.

5. The method of claim 4, wherein identifying a side of the communication that corresponds to the integrated circuit device is a function of the interface corresponding to the packet traffic and a state of the SYN and ACK fields.

6. The method of claim 1, wherein identifying a side of the communication that corresponds to the integrated circuit device is a function of the interface corresponding to the packet traffic and a state of a field in a Transmission Control Protocol (TCP) header of the packet traffic.

7. The method of claim 1, wherein identifying a side of the communication that corresponds to the integrated circuit device is a function of the interface corresponding to the packet traffic and a state of a field in a User Datagram Protocol (UDP) header of the packet traffic.

8. The method of claim 1, wherein identifying a side of a network that corresponds to the integrated circuit device includes examining a port number field in a User Datagram Protocol (UDP) header of the packet traffic.

9. The method of claim 1, wherein identifying a side of a network that corresponds to integrated circuit device includes examining a field in an Internet Control Message Protocol (ICMP) header of the packet traffic.

10. The method of claim 1, wherein identifying a side of a network that corresponds to integrated circuit device includes examining a type field in an Internet Control Message Protocol (ICMP) header of the packet traffic.

11. The method of claim 1, wherein identifying a side of a network that corresponds to integrated circuit device includes examining a field in an application layer header of the packet traffic.

12. The method of claim 1, wherein the integrated circuit device includes a table of local IP addresses and remote IP addresses and wherein determining a side of a network that corresponds to the integrated circuit device includes comparing at least one of a source IP address or a destination IP address of a received packet to the table.

13. The method of claim 1, wherein application of the task distribution rule involves executing the particular task related to the packet traffic when the side of the communication that corresponds to the integrated circuit device is determined to be the source side of the communication and not executing the particular task related to the packet traffic when the side of the communication that corresponds to the packet traffic is determined to be the destination side of the communication.

14. The method of claim 1, wherein application of the task distribution rule involves executing the particular task related to the packet traffic when the side of the communication that corresponds to the integrated circuit device is determined to be the destination side of the communication and not executing the particular task related to the packet traffic when the side of the communication that corresponds to the packet traffic is determined to be the source side of the communication.

15. The method of claim 1, wherein the task distribution rule is a function of the side determination and some additional information related to the communication.

16. The method of claim 1, further comprising identifying that the packet traffic traverses two integrated circuit devices that are configured to execute the same task distribution rule.

17. The method of claim 16, wherein identifying that the packet traffic traverses two integrated circuit devices that are configured to execute the same task distribution rule involves providing host IP addresses to a central manager and receiving aggregated IP addresses from the central manager.

18. The method of claim 17, further comprising, at the integrated circuit device, identifying an IP address of a host computer that corresponds to the integrated circuit device by inspecting the source IP address field of the IP header of a packet that is received at a host interface of the integrated circuit device.

19. The method of claim 17, further comprising, at the integrated circuit device, receiving IP address information related to a host computer that corresponds to the integrated circuit device through a management interface.

20. The method of claim 19, wherein the IP address information includes an IP prefix.

21. The method of claim 16, wherein identifying that the packet traffic traverses two integrated circuit devices that are configured to execute the same task distribution rule involves embedding in-band signaling and extracting embedded in-band signaling at the integrated circuit device.

22. The method of claim 16, wherein identifying that the packet traffic traverses two integrated circuit devices that are configured to execute the same task distribution rule involves generating out-of-band signaling and identifying out-of-band signaling at the integrated circuit device.

23. A method for processing packet traffic, the method comprising:

identifying, in a first integrated circuit device, that packet traffic of a communication between a local host computer and a remote host computer traverses the first integrated circuit device and a second integrated circuit device that are both configured to execute the same task distribution rule;

when it is identified that the packet traffic does not traverse the first and second integrated circuit devices that are configured to execute the same task distribution rule, executing, at the first integrated circuit device, a particular task related to the packet traffic;

when it is identified that the packet traffic does traverse two integrated circuit devices that are configured to execute the same task distribution rule, 1) identifying, in the first integrated circuit device, a side of the communication between the local and remote host computers that corresponds to the first integrated circuit device with regard to the packet traffic, wherein identifying a side of the communication between the local and remote host computers involves at least one of 1) identifying, at the first integrated circuit device, from the packet traffic if the first integrated circuit device is on a source side of the communication or on a destination side of the communication, and 2) identifying, at the first integrated circuit device, from the packet traffic if the first integrated circuit device is on a client side of the communication or on a server side of the communication, and 2) applying a task distribution rule to the packet traffic using the identified side of the communication that corresponds to the packet traffic to identify if a particular task related to the packet traffic should be executed at the first integrated circuit device, wherein the task distribution rule is configured to ensure that the particular task is executed at only one of the first and second integrated circuit devices;

wherein:

the integrated circuit device includes a host interface that includes a PCIe interface and a network interface that includes an Ethernet interface, wherein the local host computer is connected behind the integrated circuit device via the PCIe interface such that packet traffic generated at the local host computer and received at the PCIe interface of the integrated circuit device traverses through the integrated circuit device to reach the Ethernet interface and such that packet traffic received at the Ethernet interface of the integrated circuit device traverses through the integrated circuit device to reach the local host computer via the PCIe interface; and the integrated circuit device corresponds to the source side of the communication for packet traffic received on the PCIe interface of the integrated circuit device; and the integrated circuit device corresponds to the destination side of the communication for packet traffic received on the Ethernet interface of the integrated circuit device.

24. A method for operating integrated circuit devices that are connected by a network, the method comprising:

in a first integrated circuit device;

applying a task distribution rule to packet traffic in response to identifying a side of a communication between a local host computer and a remote host computer that corresponds to the first integrated circuit device to determine if a particular task related to the packet traffic should be executed at the first integrated circuit device, wherein a side of the communication between the local host computer and the remote host computer that corresponds to the first integrated circuit device is identified based on packet traffic of the communication that is processed in the first integrated circuit device, wherein the side of the communication between the local and remote host computers is based on at least one of 1) whether the first integrated circuit device is on a source side of the communication or on a destination side of the communication, and 2) whether, the first integrated circuit device is on a client side of the communication or on a server side of the communication;

the first integrated circuit device including a host interface that includes a PCIe interface and a network interface that includes an Ethernet interface, wherein the local host computer is connected behind the first integrated circuit device via the PCIe interface such that packet traffic generated at the local host computer and received at the PCIe interface of the first integrated circuit device traverses through the first integrated circuit device to reach the Ethernet interface and such that packet traffic received at the Ethernet interface of the first integrated circuit device traverses through the first integrated circuit device to reach the local host computer via the PCIe interface; and the first integrated circuit device corresponds to the source side of the communication for packet traffic received on the PCIe interface of the first integrated circuit device; and the first integrated circuit device corresponds to the destination side of the communication for packet traffic received on the Ethernet interface of the first integrated circuit device;

in a second integrated circuit device;

applying the task distribution rule to the packet traffic in response to identifying a side of the communication between a local host computer and a remote host computer that corresponds to the second integrated circuit device to determine if the particular task related to the packet traffic should be executed at the second integrated circuit device, wherein a side of the communication between the local host computer and the remote host computer that corresponds to the second integrated circuit device is identified based on packet traffic of the communication that is processed in the second integrated circuit device, wherein the side of the communication between the local and remote host computers is based on at least one of 1) whether the second integrated circuit device is on a source side of the communication or on a destination side of the communication, and 2) whether the second integrated circuit device is on a client side of the communication or on a server side of the communication;

the second integrated circuit device including a host interface that includes a PCIe interface and a network interface that includes an Ethernet interface, wherein the remote host computer is connected behind the second integrated circuit device via the PCIe interface such that packet traffic generated at the remote host computer and received at the PCIe interface of the second integrated circuit device traverses through the second integrated circuit device to reach the Ethernet interface and such that packet traffic received at the Ethernet interface of the second integrated circuit device traverses through the second integrated circuit device to reach the remote host computer via the PCIe interface;

the second integrated circuit device corresponds to the source side of the communication for packet traffic received on the PCIe interface of the second integrated circuit device;

the second integrated circuit device corresponds to the destination side of the communication for packet traffic received on the Ethernet interface of the second integrated circuit device; and wherein the task distribution rule that is applied at the first and second integrated circuit devices is configured to ensure that the particular task is executed by either the first integrated circuit device or the second integrated circuit device, but not both integrated circuit devices.

25. An integrated circuit device comprising:
a host interface that includes a PCIe interface;
a network interface that includes an Ethernet interface; and
a packet traffic processor configured to:
apply a task distribution rule to packet traffic in response to an identified side of a communication between a local host computer and a remote host computer to determine if a particular task related to the packet traffic should be executed at the integrated circuit device, wherein the task distribution rule is configured to ensure that the particular task is executed at only one side of the communication between the local host computer and the remote host computer, wherein a side of the communication between the local host computer and the remote host computer is identified based on packet traffic of the communication that is processed in the integrated circuit device, wherein the side of the communication between the local and remote host computers is based on at least one of 1) whether the integrated circuit device is on a source side of the communication or on a destination side of the communication, and 2) whether the integrated circuit device is on a client side of the communication or on a server side of the communication, wherein the integrated circuit device corresponds to the source side of the communication for packet traffic that is received on the PCIe interface of the integrated circuit device, and the integrated circuit device corresponds to the destination side of the communication for packet traffic that is received on the Ethernet interface of the integrated circuit device, wherein packet traffic generated at the local host computer and received at the PCIe interface traverses through the integrated circuit device to reach the Ethernet interface and packet traffic received at the Ethernet interface traverses through the integrated circuit device to reach the local host computer via the PCIe interface.

26. The integrated circuit device of claim 25, wherein the integrated circuit device is included in a Network Interface Card.

27. An integrated circuit device comprising:
a host interface that includes a PCIe interface;
at least one network interface that includes an Ethernet interface; and
logic configured to:
apply a task distribution rule to packet traffic in response to an identified side of a communication between a local host computer and a remote host computer that corresponds to the integrated circuit device to determine if a particular task related to the packet traffic should be executed at the integrated circuit device, wherein the task distribution rule is configured to ensure that the particular task is executed at only one side of the communication between the local host computer and the remote host computer, wherein a side of the communication between the local host computer and the remote host computer is identified based on packet traffic of the communication that is processed in the integrated circuit device, wherein the side of the communication between the local and remote host computers is based on involves at least one of 1) whether the integrated circuit device is on a source side of the communication or on a destination side of the communication, and 2) whether the integrated circuit device is on a client side of the communication or on a server side of the communication, wherein the integrated circuit device corresponds to the source side of the communication for packet traffic received on the PCIe interface of the integrated circuit device, and the integrated circuit device corresponds to the destination side of the communication for packet traffic received on the Ethernet interface of the integrated circuit device, wherein packet traffic generated at the local host computer and received at the PCIe interface traverses through the integrated circuit device to reach the Ethernet interface and packet traffic received at the Ethernet interface traverses through the integrated circuit device to reach the local host computer via the PCIe interface.

28. The integrated circuit device of claim 27, wherein identifying a side of a communication that corresponds to the integrated circuit device includes examining a field in a header of the packet traffic.

29. The integrated circuit device of claim 28, wherein identifying a side of the communication that corresponds to the integrated circuit device is a function of an interface corresponding to the packet traffic and a state of the field in the header.

30. The integrated circuit device of claim 27, wherein identifying a side of a communication that corresponds to the integrated circuit device includes examining the Synchronize (SYN) and Acknowledge (ACK) fields in a Transmission Control Protocol (TCP) header of the packet traffic.

31. The integrated circuit of claim 30, wherein identifying a side of the communication that corresponds to the integrated circuit device is a function of the interface corresponding to the packet traffic and a state of the SYN and ACK fields.

32. The integrated circuit of claim 27, wherein identifying a side of the communication that corresponds to the integrated circuit device is a function of the interface corresponding to the packet traffic and a state of a field in a Transmission Control Protocol (TCP) header of the packet traffic.

33. The integrated circuit of claim 27, wherein identifying a side of the communication that corresponds to the integrated circuit device is a function of the interface corresponding to the packet traffic and a state of a field in a User Datagram Protocol (UDP) header of the packet traffic.

34. The integrated circuit device of claim 27, wherein identifying a side of a network that corresponds to the integrated circuit device includes examining a port number field in a User Datagram Protocol (UDP) header of the packet traffic.

35. The integrated circuit device of claim 27, wherein identifying a side of a network that corresponds to integrated circuit device includes examining a field in an Internet Control Message Protocol (ICMP) header of the packet traffic.

36. The integrated circuit device of claim 27, wherein identifying a side of a network that corresponds to integrated circuit device includes examining a type field in an Internet Control Message Protocol (ICMP) header of the packet traffic.

37. The integrated circuit device of claim 27, wherein identifying a side of a network that corresponds to integrated circuit device includes examining a field in an application layer header of the packet traffic.

38. The integrated circuit device of claim 27, wherein the integrated circuit device includes a table of local IP addresses and remote IP addresses and wherein identifying a side of a network that corresponds to the integrated circuit device includes comparing at least one of a source IP address or a destination IP address of a received packet to the table.

* * * * *